US010081973B2

(12) United States Patent
Ueyama

(10) Patent No.: US 10,081,973 B2
(45) Date of Patent: Sep. 25, 2018

(54) REFRIGERATOR

(71) Applicant: TOSHIBA LIFESTYLE PRODUCTS & SERVICES CORPORATION, Kawasaki-shi, Kanagawa (JP)

(72) Inventor: Hideo Ueyama, Tokyo (JP)

(73) Assignee: TOSHIBA LIFESTYLE PRODUCTS & SERVICES CORPORATION, Kawasaki-Shi (JP)

( * ) Notice: Subject to any disclaimer, the term of this patent is extended or adjusted under 35 U.S.C. 154(b) by 0 days.

(21) Appl. No.: 15/701,004

(22) Filed: Sep. 11, 2017

(65) Prior Publication Data

US 2017/0370137 A1    Dec. 28, 2017

Related U.S. Application Data

(60) Division of application No. 14/992,868, filed on Jan. 11, 2016, now Pat. No. 9,790,721, which is a
(Continued)

(30) Foreign Application Priority Data

Jul. 12, 2013    (JP) .................................. 2013-146435

(51) Int. Cl.
*A47B 96/04*        (2006.01)
*E05D 7/00*         (2006.01)
(Continued)

(52) U.S. Cl.
CPC ............ *E05D 7/00* (2013.01); *F25D 23/028* (2013.01); *H04B 7/24* (2013.01); *E05D 11/0081* (2013.01);
(Continued)

(58) Field of Classification Search
CPC ... E05D 7/00; E05D 11/0081; E05Y 2900/31; H04B 7/24; F25D 2323/024;
(Continued)

(56) References Cited

U.S. PATENT DOCUMENTS

2006/0196206 A1    9/2006  Murray et al.
2007/0193294 A1    8/2007  Murray et al.
(Continued)

FOREIGN PATENT DOCUMENTS

CN           1869560        11/2006
JP         2001-311108      11/2001
(Continued)

OTHER PUBLICATIONS

International Search Report (with English Translation) issued in PCT/JP2014/003661 dated Oct. 28, 2014.
(Continued)

*Primary Examiner* — Hanh Van Tran
(74) *Attorney, Agent, or Firm* — DLA Piper LLP US

(57) ABSTRACT

A refrigerator of this embodiment includes a housing that includes a storeroom, a door that is rotatably provided in the housing through a hinge portion and opens or closes an opening of the storeroom by the rotation, a connection line that is led out to the vicinity of the hinge portion, and a wireless communication apparatus that includes a wireless communication unit and is connected to the connection line.

20 Claims, 17 Drawing Sheets

Related U.S. Application Data continuation of application No. PCT/JP2014/003661, filed on Jul. 10, 2014.

(51) Int. Cl.
*H04B 7/24* (2006.01)
*F25D 23/02* (2006.01)
*E05D 11/00* (2006.01)

(52) U.S. Cl.
CPC ....... *E05Y 2900/31* (2013.01); *F25D 2300/00* (2013.01); *F25D 2323/024* (2013.01); *F25D 2400/40* (2013.01); *F25D 2600/00* (2013.01)

(58) Field of Classification Search
CPC ............. F25D 2400/40; F25D 2300/00; F25D 2600/00; F25D 29/005; F25D 29/00; F25D 23/028
See application file for complete search history.

(56) References Cited

U.S. PATENT DOCUMENTS

| | | |
|---|---|---|
| 2008/0165509 A1 | 7/2008 | Kendall et al. |
| 2008/0231764 A1 | 9/2008 | Kendall et al. |
| 2008/0232053 A1 | 9/2008 | Kendall et al. |
| 2008/0247141 A1 | 10/2008 | Kendall et al. |
| 2009/0009316 A1 | 1/2009 | Kendall et al. |
| 2009/0289536 A1 | 11/2009 | Park et al. |
| 2010/0182753 A1 | 7/2010 | Kendall et al. |

FOREIGN PATENT DOCUMENTS

| | | |
|---|---|---|
| JP | 2003-224891 | 8/2003 |
| JP | 2004-333069 | 11/2004 |
| JP | 2005-140345 | 6/2005 |
| JP | 2005-315479 | 11/2005 |
| JP | 2006-064320 | 3/2006 |
| JP | 2006-170604 | 6/2006 |
| JP | 4191723 | 12/2008 |

OTHER PUBLICATIONS

Written Opinion ((with English Translation) issued in PCT/JP2014/003661 dated Oct. 28, 2014.
International Preliminary Report on Patentability issued in PCT/JP2014/003661 dated Jan. 12, 2016.
English Translation of JP 2005-140345 published on Jun. 2, 2005.
English Translation of JP 2006-170604 published on Jun. 29, 2006.
English Translation of JP 2004-333069 published on Nov. 25, 2004.
English Translation of JP 2005-315479 published on Nov. 10, 2005.
English Translation of JP 2001-311108 published on Nov. 9, 2001.
English Translation of JP 2006-064320 published on Mar. 9, 2006.
Taiwanese Office Action (with English Translation) issued in Taiwanese Application No. 103123827 dated Jul. 1, 2016.
Chinese Office Action (with English Translation) issued in Chinese Application No. 201480039699.0 dated Nov. 18, 2016.
English Language Translation and Abstract of CN 1869560 published on Nov. 29, 2006.
Extended European Search Report issued in EP 14822860.4 dated Feb. 17, 2017.
English Language Translation of JP 2003-224891 published Aug. 8, 2003.
Korean Office Action (with English Translation) issued in Korean Application No. 10-2016-700319 dated Jun. 29, 2017.
English Translation of JP 4191723 published on Dec. 3, 2008.
Korean Office Action issued in KR 10-2018-7018554 dated Jul. 13, 2018.

US 10,081,973 B2

REFRIGERATOR

CROSS-REFERENCE TO RELATED APPLICATIONS

This application is a divisional of U.S. application Ser. No 14/992,868 filed Jan. 11, 2016 which is a continuation of prior International Application No. PCT/JP2014/003661 filed on Jul. 10, 2014, which is based upon and claims the benefit of priority from Japanese Patent Application No. 2013-146435 filed on Jul. 12, 2013, the entire contents of all of which are incorporated herein by reference.

FIELD

Embodiments herein relate to a refrigerator.

BACKGROUND

For example, there is proposed a refrigerator in which a wireless communication apparatus (wireless adaptor) capable of communicating with an external apparatus is provided in the upper surface of a ceiling of a housing.

However, wirings of connection lines connected to the wireless communication apparatus are not specifically determined.

BRIEF DESCRIPTION OF THE DRAWINGS

FIG. 1A is a plan view thereof and FIG. 1B is a front view of an upper portion thereof.

DETAILED DESCRIPTION

Figure 1A:
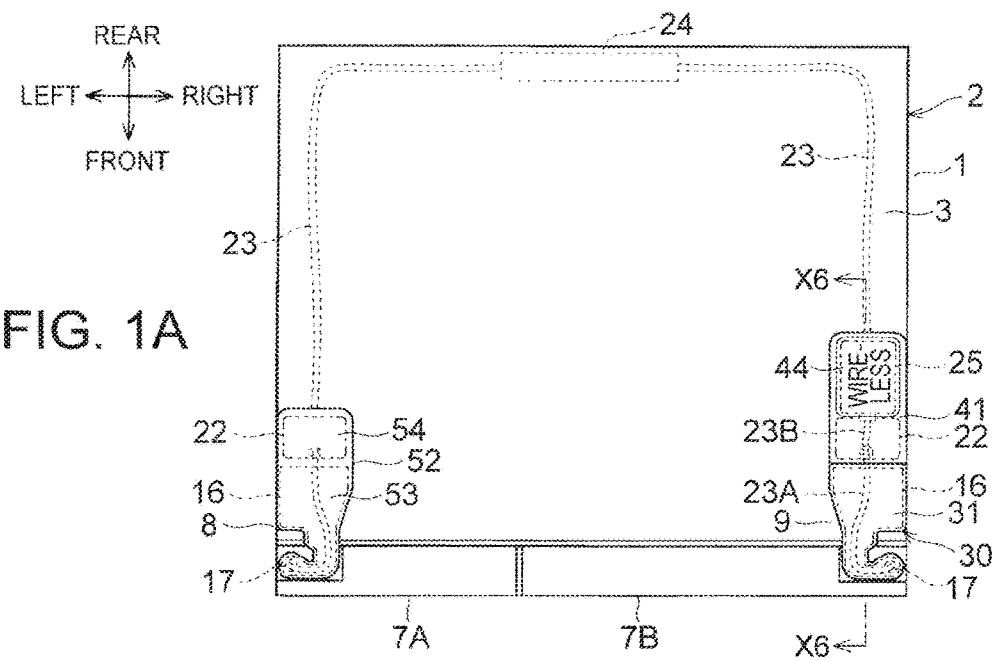
FIGS. 1A and 1B show an outline of a refrigerator according to a first embodiment.

Hereinafter, the refrigerator according to the embodiments will be described based on the drawing. Further, in each embodiment, the same components will be denoted with the same symbols, and the descriptions thereof will not be repeated.

According to one embodiment, a refrigerator includes: a housing that includes a storeroom; a door that is rotatably provided in the housing through a hinge portion and opens or closes an opening of the storeroom by the rotation; a connection line that is led out to the vicinity of the hinge portion; and a radio communication member that includes a radio communication unit and is connected to the connection line.

(First Embodiment)

Figure 1B:
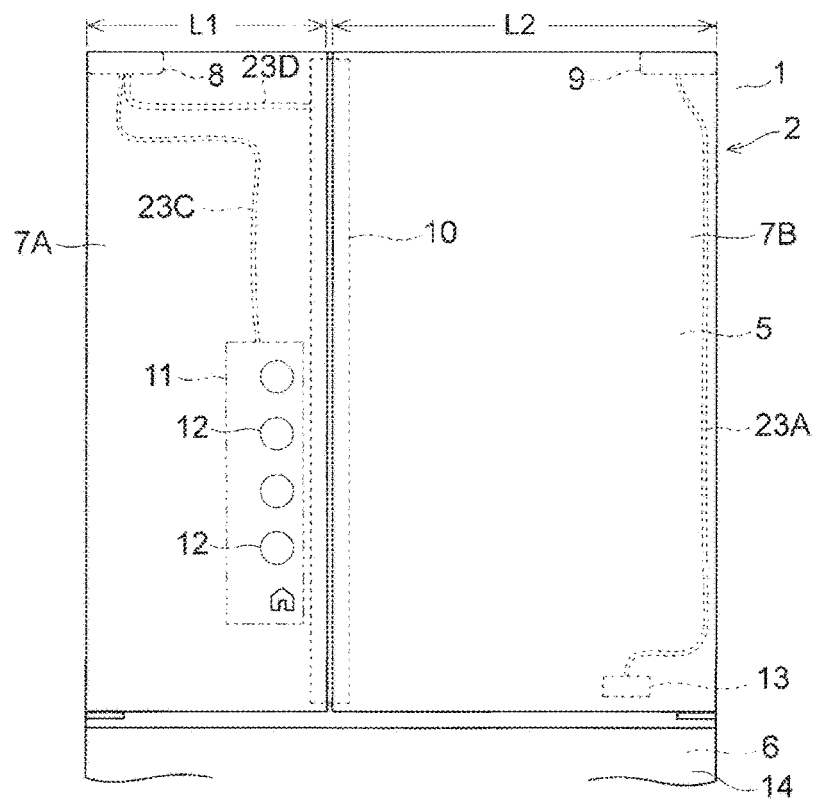
Figure 2:
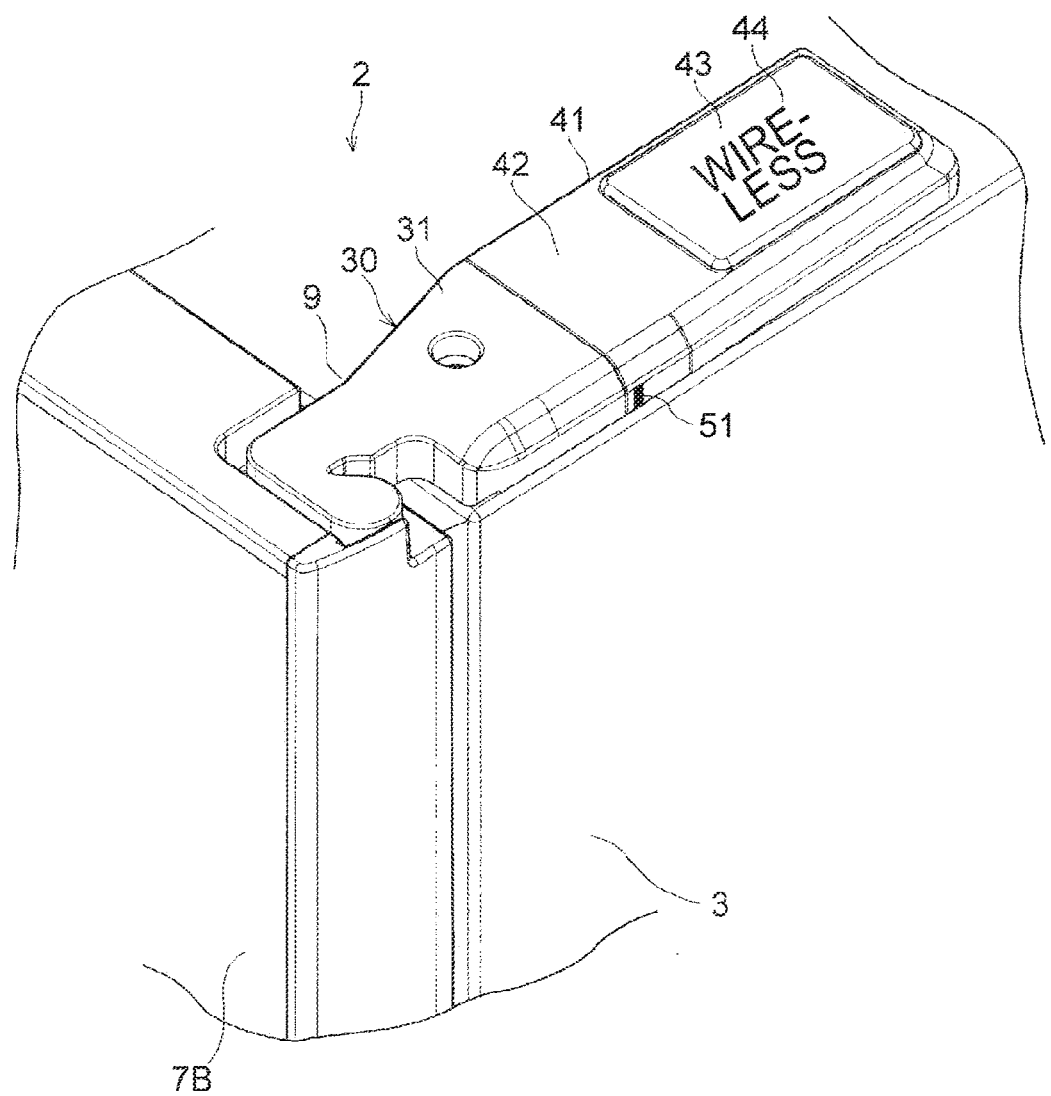
FIG. 2 is a perspective view illustrating the vicinity of a hinge unit in the right upper portion.

A first embodiment will be described with reference to FIGS. 1 to 9. As illustrated in FIGS. 1A and 1B, a housing 2 of a refrigerator 1 is formed in a rectangular box shape having the opened front surface and is configured such that a heat-insulating member 4 (see FIG. 6) made of a heat-insulating foam material such as urethane foam is filled between a steel outer case 3 and a synthetic resin inner case (not illustrated). The housing 2 includes a plurality of storerooms therein. As the storeroom, a refrigerating room 5 is provided in the uppermost portion, a vegetable room 6 is proved therebelow, and an ice making room and a freezing room (not illustrated) are provided below the vegetable room 6.

In this case, a front opening of the refrigerating room 5 is opened or closed by two doors 7A and 7B of a double door type. In the two doors 7A and 7B, the left end portion of a left door 7A when viewed from the front side is supported to the housing 2 to be freely rotated by a hinge unit 8, and the right end portion of a right door 7B is supported to the housing 2 to be freely rotated by a hinge unit 9. In this case, a width dimension L1 in the left-right direction of the left door 7A is set to be smaller than a width dimension L2 in the left-right direction of the right door 7B (L1<L2). A vertical partitioning member 10 is provided on the rear surface side of the right end portion (that is, the free end side of the left door 7A). The vertical partitioning member 10 is provided in the door 7A to be freely rotated in a horizontal direction. In a state where the left door 7A is closed, a part of the vertical partitioning member 10 is pulled out to the right side to receive the left end portion of the right door 7B, and the vertical partitioning member 10 is rotated to the rear side as the left door 7A is rotated in an opening direction. In addition, an operation panel 11 of a touch panel type is provided on the front surface side of the left door 7A. In the operation panel 11, an electrostatic switch 12 and a displaying LED (not illustrated) are provided. A front opening of the vegetable room 6 is opened and closed by a drawing door 14. A vessel (not illustrated) is provided on the rear side of the door 14.

Next, the configuration of the vicinity of the hinge unit 9 of the right upper portion in the right door 7B in the right and left doors 7A and 7B of the refrigerating room 5 will be described with reference to FIGS. 2 to 6. A hinge portion 16 (see FIGS. 3 and 6) in the hinge unit 9 is made of metal (for example, steel), and the rear portion thereof is screwed and fixed to the right front portion of the upper surface of a ceiling part of the housing 2, a hinge shaft 17 of the front portion is connected to the right upper end portion of the door 7B to be freely rotated. The hinge shaft 17 is a cylindrical shape facing downward.

In the ceiling part of the housing 2, a connection line lead-out member 18 is provided on the rear side of the hinge portion 16. The connection line lead-out member 18 is, for example, made of a synthetic resin in a rectangular shape of which the upper surface is opened, and is fitted into an opening 19 (see FIG. 6) formed in a ceiling part of the outer case 3 of the housing 2 from the upper side so that the lower portion is inserted in the heat-insulating member 4. The connection line lead-out member 18 is provided with an outlet 20 and a storage recess 21. The outlet 20 and the storage recess 21 form a connection line lead-out portion 22. A metal member (in this case, an aluminum foil 15 (see FIG. 6)) is provided in the inner surface of the storage recess 21. The aluminum foil 15 is used for the protection of the heat-insulating member 4 and for the prevention of dew condensation. The upper end portion of a peripheral wall 18a of the connection line lead-out member 18 protrudes upward, for example, by 2 mm or more from the upper surface of the housing 2 (the outer case 3). The peripheral wall 18a serves as a water infiltration prevention means which prevents the water from being infiltrated to the connection line lead-out portion 22.

A plurality of connection lines 23 are provided in the wall of the housing 2 in the vicinity of the hinge unit 9. One ends of the connection lines 23 are connected to a control device 24 (see FIG. 1A) which is provided in the back surface of the housing 2, and the other ends are led out through the outlet 20 to the connection line lead-out portion 22. The control device 24 is a main control device which controls the entire operation of the refrigerator 1, and is configured by a microcomputer as a main part.

Figure 7:
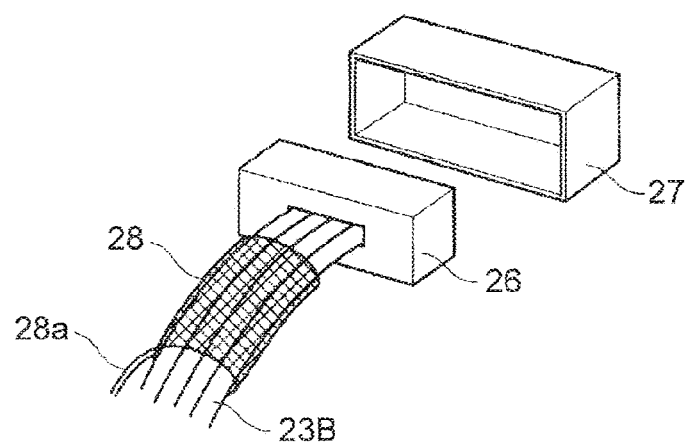
FIG. 7 is a perspective view schematically illustrating a connector of a connection line and a connector cover.

Connection lines 23A in the connection lines 23 led out to the connection line lead-out portion 22 are wired toward the hinge portion 16, and inserted through the hinge shaft 17. For example, the connection lines 23A are used for the connection to a humidity sensor 13 and the like (see FIG. 1B). For example, the humidity sensor 13 is provided to detect humidity in the vegetable room 6. The rest connection lines 23B in the connection lines 23 led out to the connection line lead-out portion 22 are used for the connection to an IT adaptor 25 as a wireless communication apparatus described below, and a connector 26 is provided in the leading end. A connector cover 27 illustrated in FIG. 7 is detachably attached to the connector 26. In a case where the IT adaptor 25 is not provided, the connection lines 23B and the connector 26 are stored in the storage recess 21 in a state where the connector cover 27 is attached to the connector 26.

In the vicinity of the connection lines 23B for the connection of the IT adaptor 25, a metal line 28 is provided to cover the connection lines in a spiral shape so as to shield noises caused by the connection lines 23B. One end of an earth line 28a is connected to the metal line 28, and the other end of the earth line 28a is connected to the metal hinge portion 16 by a screw or the like (see FIG. 3).

Figure 3:
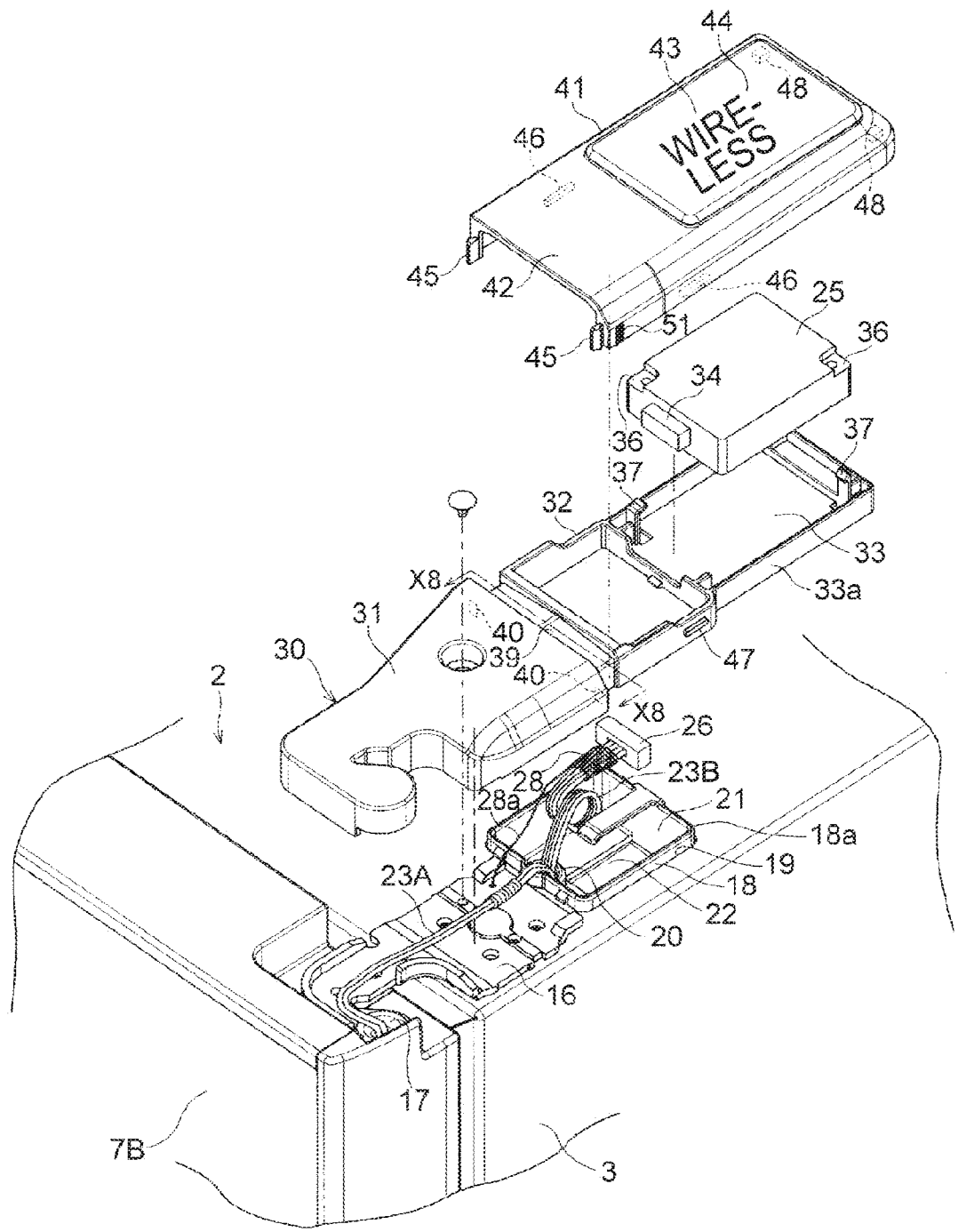
FIG. 3 is an exploded perspective view illustrating the vicinity of the hinge unit in the right upper portion.

A hinge cover 30 is screwed to the upper surface of the hinge portion 16. The hinge cover 30 is made of, for example, a synthetic resin, in which a hinge cover portion 31 covering the hinge portion 16 from the upper side, a surrounding portion 32 surrounding the connection line lead-out member 18, and a storage portion 33 in a shallow vessel shape are integrally provided as illustrated in FIG. 3. The storage portion 33 is provided on the rear side of the surrounding portion 32. The hinge cover portion 31 also covers the connection lines 23A which are wired toward the hinge portion 16. The height of the surrounding portion 32 is set to be higher than that of the peripheral wall 18a of the connection line lead-out member 18, and the surrounding portion 32 also serves as the water infiltration prevention member which prevents the water infiltration into the connection line lead-out portion 22. The surrounding portion 32 forms a part of the connection line lead-out portion 22.

In the storage portion 33, the IT adaptor 25 forming the wireless communication apparatus is stored. The storage portion 33 serves as a mounting portion in which the IT adaptor 25 is mounted. The IT adaptor 25 stored in the storage portion 33 includes a connector 34 which protrudes forward in the front surface portion, and includes a wireless communication unit 35 (see FIG. 6) therein. The wireless communication unit 35 is provided on a wiring board 35a configured by a printed circuit substrate. On the upper surface of the wiring board 35a, while not illustrated in the drawing, a wiring of an elongated F shape is provided as an antenna. The wiring board 35a and the antenna are positioned to be parallel to the lower surface of the IT adaptor 25 and the upper surface of the housing 2.

In the upper surface portion of the IT adaptor 25, step portions 36 are formed in two corners positioned on a diagonal line to be lower than the peripheral portion. In the storage portion 33, elastically deformable engaging claws 37 are integrally provided at positions corresponding to these step portions 36. In a state where the IT adaptor 25 is stored at a regular position in the storage portion 33, these engaging claws 37 are engaged to the corresponding step portions 36 so as to mount and hold the IT adaptor 25 in the storage portion 33. In a state where the IT adaptor 25 is mounted at the regular position of the storage portion 33, the wireless communication unit 35 faces upward, and the connector 34 faces forward, so that the connector 26 of the connection lines 23B is connected to the connector 34 detachably from the front side. In this case, in a state where the IT adaptor 25 is mounted at the regular position of the storage portion 33, a distance H1 (see FIG. 6) between the antenna of the wireless communication unit 35 and the upper surface of the housing 2 is set to, for example, 10 mm.

Herein, when the IT adaptor 25 is mounted in the storage portion 33, for example, in a case where the IT adaptor 25 is mounted in the storage portion 33 in the vertically reversed direction, the step portions 36 cannot be engaged with the engaging claws 37, so that the IT adaptor 25 is not possible to be mounted in the storage portion 33. In this case, when the IT adaptor 25 is mounted in the storage portion 33, the step portions 36 and the engaging claws 37 serve as mounting regulation member for positioning the wireless communication unit 35 to face upward. A side wall 33a around the storage portion 33 serves as the water infiltration prevention member for preventing the water from being infiltrated into the storage portion 33.

Figure 8:
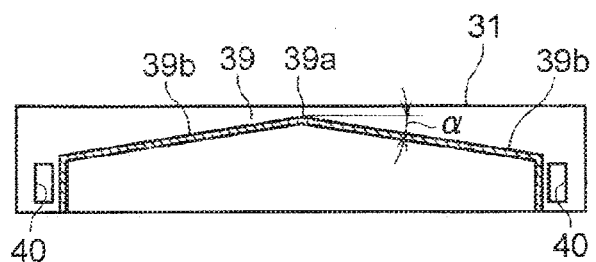
FIG. 8 is a vertical cross-sectional view taken along line X8-X8 in FIG. 3.

In the hinge cover 30, a connection portion 39 is integrally provided between the hinge cover portion 31 and the surrounding portion 32. The connection portion 39 is formed in a mountain shape as illustrated in FIG. 8, a center portion 39a in the lateral direction is high, and inclined portions 39b and 39b are formed to be inclined downward as it goes from the center portion 39a to the right and left both ends. An inclined angle α formed between the inclined portion 39b and the horizontal surface is desirably set to 5 degrees or more. With this configuration, even when the water is poured onto the connection portion 39, the water can quickly flow toward the end portion along the inclined portion 39b so as to prevent that the water accumulates in the connection portion 39. The connection portion 39 of the mountain shape also serves as the water infiltration prevention member which prevents the water infiltration with respect to the connection line lead-out portion 22. As illustrated in FIG. 8, engagement holes 40 are formed at both right and left positions of the connection portion 39 in the rear surface portion of the hinge cover portion 31.

In the upper surface of the hinge cover 30, a communication unit cover 41 is detachably mounted at a position on the rear side of the hinge cover portion 31. The communication unit cover 41 integrally includes a lead-out portion cover portion 42 made of a synthetic resin covering the enveloping portion 32 and the connection line lead-out portion 22 from the upside, and includes an adaptor cover portion 43 covering the IT adaptor 25 from the upper side. The adaptor cover portion 43 is formed such that a portion corresponding to the IT adaptor 25 is heightened by one step. In the upper surface of the adaptor cover portion 43, a display portion 44 denoted by character "A" (in this case, "Wireless") is provided. Since the display portion 44 is used to indicate that the IT adaptor 25 (the wireless communication apparatus) is stored therein, it is not limited to the characters, but may be an illustration for example. The indication of the characters and the illustration may be printed to the adaptor cover portion 43, or may be electrically displayed if desired.

Figure 4:
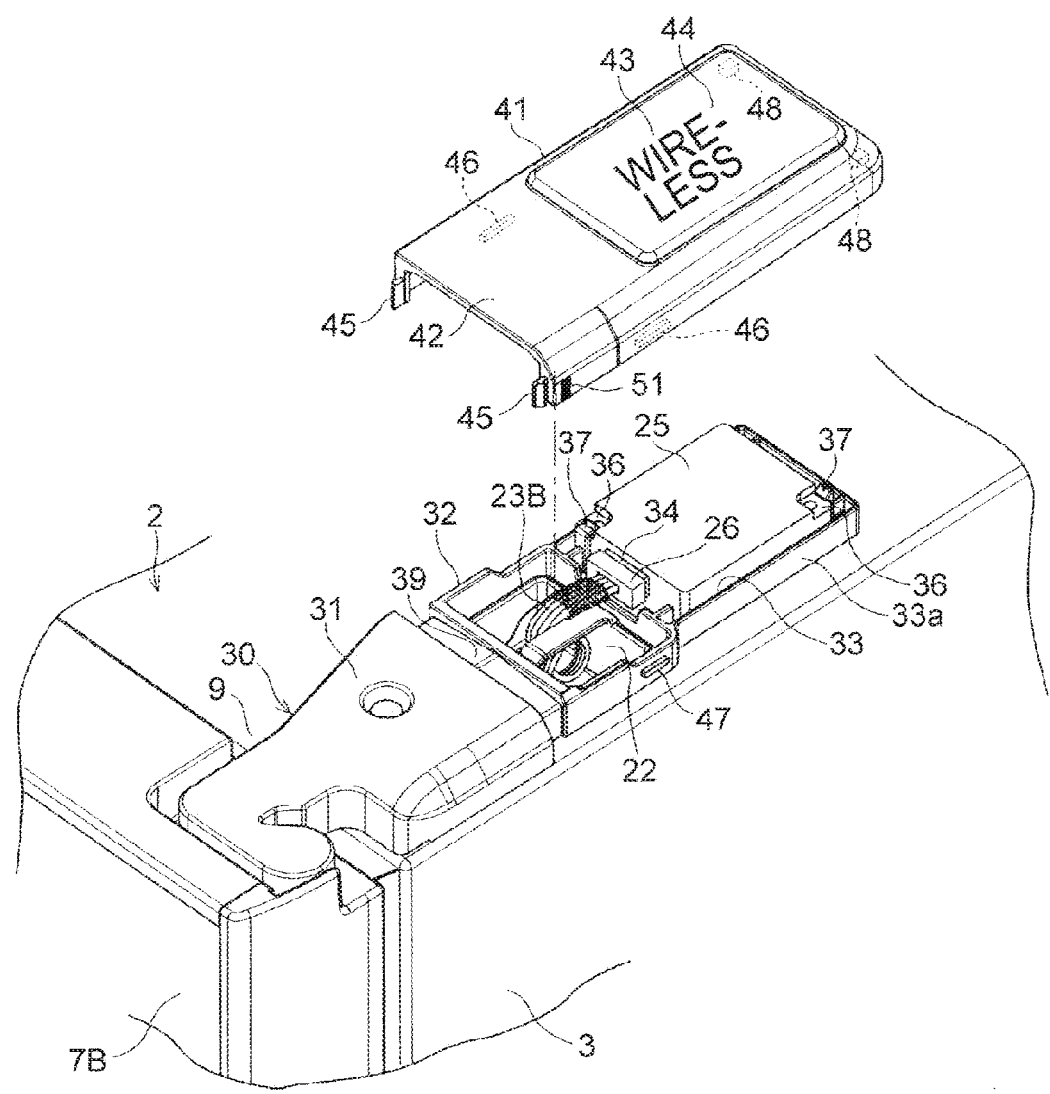
FIG. 4 is a perspective view in a state where a communication unit cover in the vicinity of the hinge unit in the right upper portion is separated.
Figure 5:
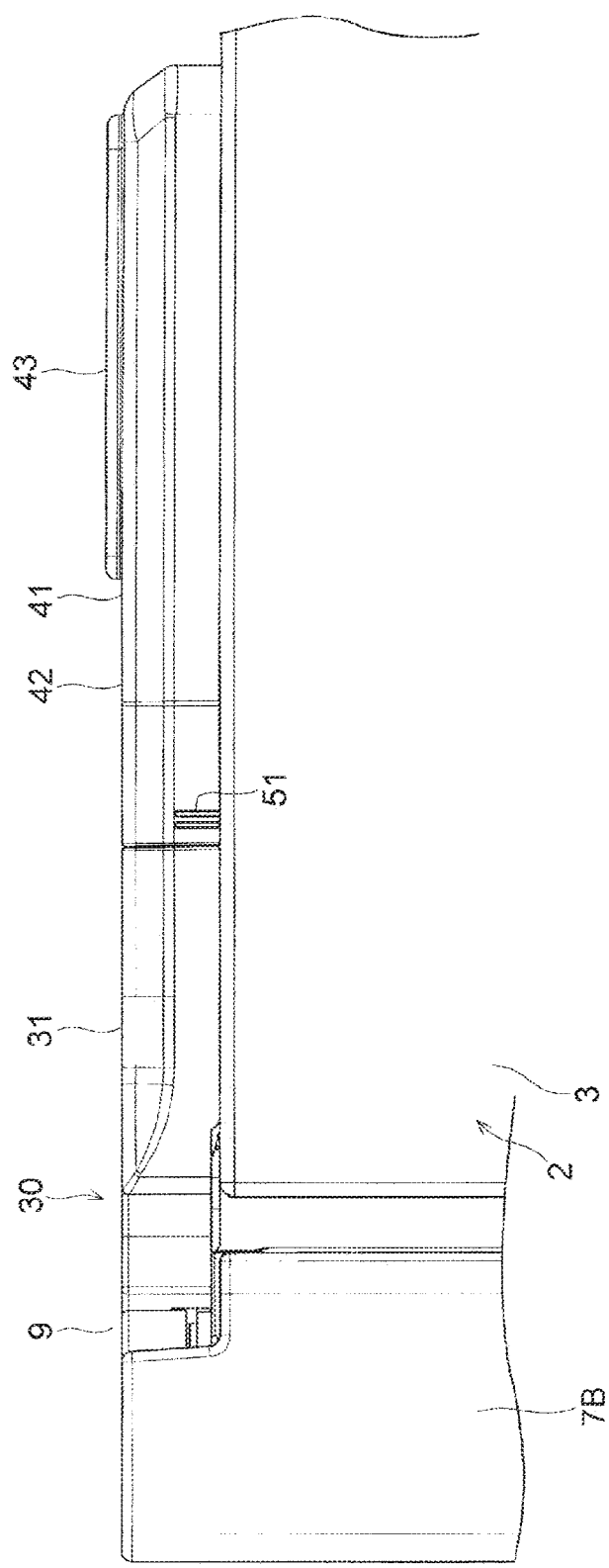
FIG. 5 is a side view illustrating the vicinity of the hinge unit in the right upper portion.
Figure 6:
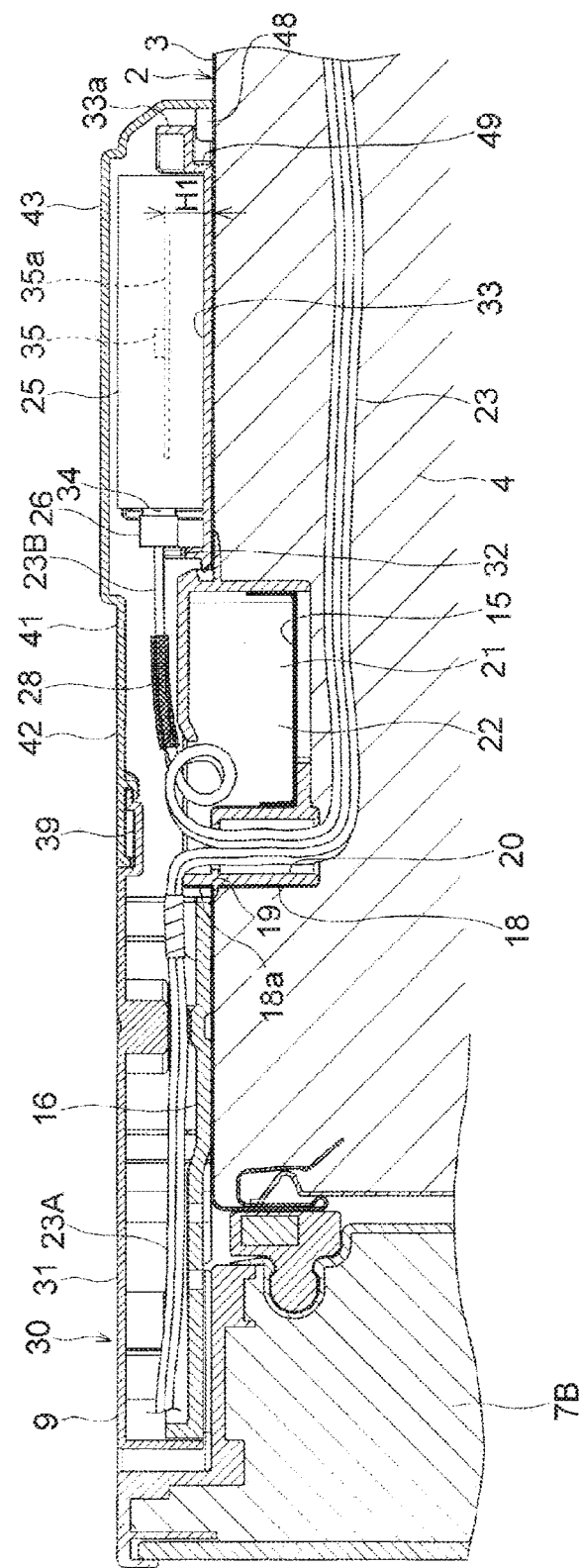
FIG. 6 is a cross-sectional side view taken along line X6-X6 in FIG. 1A.

Engaging claws 45 engaged with the engagement holes 40 are provided on both the right and left sides in the front portion of the communication unit cover 41. The engaging claws 45 are elastically deformable, and are inserted from the rear side to the engagement holes 40 to be engaged in a pulling-out preventing state. Projections 46 protruding inward are provided in the inner surfaces of both the right and left side walls of the lead-out portion cover portion 42 in the communication unit cover 41. Projections 47 (only one projection is illustrated in FIGS. 3 and 4) protruding sideward are provided in the outer surfaces of both the right and left side walls of the surrounding portion 32. The projections 46 and the projections 47 are provided at positions corresponding to each other and slightly shifted in the vertical direction. Projections 48 (for example, two projections) protruding forward are provided in the lower end portion of the rear wall of the adaptor cover portion 43 in the communication unit cover 41. In the rear portion of the storage portion 33, a depression 49 opened toward the rear surface side is formed as illustrated in FIG. 6.

Herein, when the communication unit cover 41 is mounted on the upper surface of the hinge cover 30, the communication unit cover 41 is positioned slightly backward on the upper surfaces of the surrounding portion 32 and the storage portion 33, and slid forward. At this time, the projections 46 of the communication unit cover 41 go into the lower side of the projections 47 of the surrounding portion 32, and the projections 48 of the communication unit cover 41 go into the depressions 49 of the rear portion of the storage portion 33 from the rear side. Then, the engaging claws 45 on both the right and left sides of the front portion of the communication unit cover 41 are engaged with the engagement holes 40 of the hinge cover portion 31. Therefore, the communication unit cover 41 is mounted on the hinge cover 30 while preventing that the cover floats upward with respect to the hinge cover 30.

In this case, the engagement holes 40, the projections 47, and the depressions 49 in the hinge cover 30 and the engaging claws 45, the projections 46, and the projections 48 in the communication unit cover 41 form floating prevention member which prevent the floating of the communication unit cover 41 with respect to the hinge cover 30. Therefore, in a state where the communication unit cover 41 is mounted on the upper surface of the hinge cover 30, the front portion of the communication unit cover 41 is positioned to cover the connection portion 39 from the upper side (see FIG. 6).

The hinge cover portion 31 covering the hinge portion 16, the connection line lead-out portion 22, and the communication unit cover 41 covering the IT adaptor 25 stored in the storage portion 33 are formed to be gradually spread in the width (horizontal direction) as it goes from the hinge portion 16 of the front portion to the IT adaptor 25 of the rear portion. The wireless communication unit 35 of the IT adaptor 25 stored in the storage portion 33 is higher than the upper surface of the housing 2 (the upper surface of the outer case 3), and is disposed at a position higher than that of the hinge portion 16. The aluminum foil 15 provided in the inner surface of the storage recess 21 in the connection line lead-out portion 22 is positioned on the lower side from the wireless communication unit 35 of the IT adaptor 25.

In the front portions of the outer side surfaces on both the right and left sides of the communication unit cover 41, slipping prevention portions 51 are provided at positions near the engaging claws 45 for a attaching/detaching operation. In this case, the slipping prevention portions 51 are configured by two bead portions which are extended in the vertical direction. The lower ends of the two bead portions are extended down to the lower ends of both the right and left side walls of the communication unit cover 41.

When the communication unit cover 41 is mounted on the upper surface of the hinge cover 30, an operator grips the communication unit cover 41 while holding the right and left slipping prevention portions 51 using fingers, and slides the communication unit cover 41 forward with respect to the hinge cover 30, so that the right and left engaging claws 45 can be engaged with the engagement holes 40. In addition, in a case where the communication unit cover 41 is taken off from the hinge cover 30, the operator presses and elastically deforms the slipping prevention portions 51 to the inward direction in a state where the right and left slipping prevention portions 51 are held by the fingers, and slides the communication unit cover 41 to the rear side, so that the engagement between the engaging claws 45 and the engagement holes 40 can be released. In this way, with the configuration of the slipping prevention portions 51, the attaching/detaching operation is easily performed when the communication unit cover 41 is attached or detached with respect to the hinge cover 30.

Further, the hinge unit 8 of the left upper portion supporting the left door 7A of the refrigerating room 5 is provided with a hinge portion 16 similar to the hinge portion 16 described, the connection line lead-out portion 22, and a hinge cover 52 while not illustrated in detail. The hinge cover 52 integrally includes a hinge cover portion 53 covering the hinge portion 16 and a lead-out portion cover portion 54 covering the connection line lead-out portion 22.

The IT adaptor 25 is not provided in the hinge unit 8 side. The connection lines 23 derived from the control device 24 toward the hinge unit 8 side pass in the wall of the housing 2 and are led out in the connection line lead-out portion 22, and are wired from the hinge shaft 17 to the door 7A side. In this case, as illustrated in FIG. 1B, the connection lines 23 include connection lines 23C for the operation panel 11 and a heater connection line 23D. The connection lines 23C for the operation panel 11 include control lines for the electrostatic switch 12 and for LED control. In addition, the heater connection line 23D is connected to a heater (not illustrated) which is provided in the vertical partitioning member 10 for the prevention of dew condensation. The applied voltage of the heater connection line 23D is 100 V, and the thickness thereof is thicker than those of the other connection lines.

Figure 9:
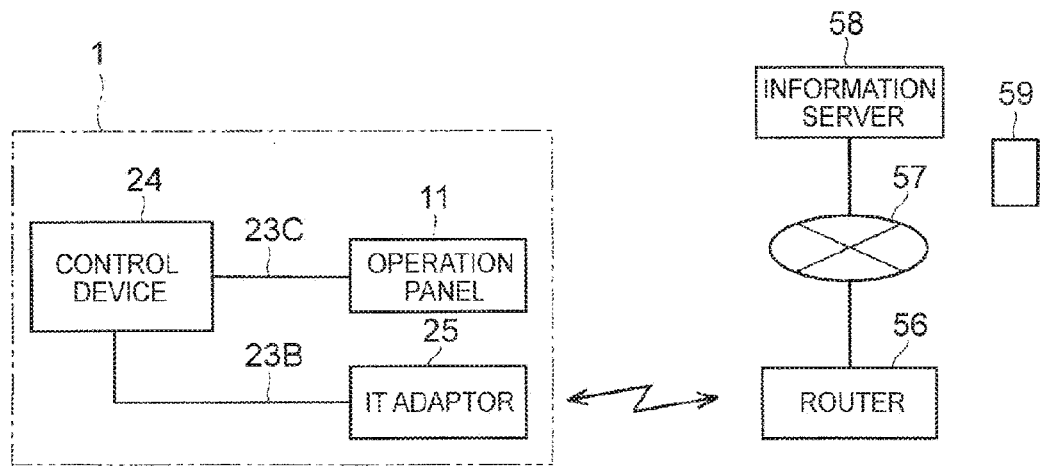
FIG. 9 is a schematic diagram of a system configuration related to an IT adaptor.

FIG. 9 illustrates a schematic diagram of a system configuration related to the IT adaptor 25. The IT adaptor 25 provided in the refrigerator 1 is connected to the control device 24 of the refrigerator 1 through the connection lines 23B. In addition, the operation panel 11 of the refrigerator 1 is connected to the control device 24 through the connection lines 23C. The IT adaptor 25 can perform wireless communicate with an external apparatus (in this case, a router 56 installed in a house) through the wireless communication unit 35. The router 56 is connected to an information server 58 through the Internet 57. A user can access the information server 58 from a mobile terminal 59 of the user through the Internet 57. In this case, a wavelength λ of the radio wave from the wireless communication unit 35 is 120 mm.

According to the above-described embodiment, the following effects can be obtained.

The embodiments provide a refrigerator in which a wireless communication apparatus and wirings can be easily layout.

In the conventional refrigerator, the connection line connected to the control device of the refrigerator is led out in the vicinity of the hinge portion of the door, and therefrom wired toward the door through the hinge shaft. Herein, in this embodiment, the IT adaptor 25 of the wireless communication apparatus is disposed in the vicinity of the hinge portion 16 of the door 7B of the refrigerator 1. Therefore, the connection lines 23B connected to the IT adaptor 25 and the other connection lines 23A wired toward the door through the hinge shaft 17 can be shared by the connection line lead-out portion 22. Therefore, the IT adaptor 25 and the connection lines 23B can be easily layout. In addition, similarly to the other connection lines 23A wired toward the door 7B, the connection lines 23B connected to the IT adaptor 25 easily pass in a wall (a heat-insulating member) 4 of the housing 2, and the connection lines 23B can be wired not to be exposed to the upper surface of the housing 2.

Since the IT adaptor 25 is disposed in the vicinity of the hinge portion 16 of the door 7B, a shock is hardly received when the door 7B is closed. In a case where the IT adaptor 25 is disposed on the free end side (the upper surface of the housing 2, and the vicinity of the center portion in the lateral direction when viewed from the front side) opposite to the hinge portion 16 in the door 7B, there is a problem that a shock is easily caused when the door 7A and the door 7B are closed, but the IT adaptor 25 according to this embodiment is not affected by such a problem. In particular, in a case where the IT adaptor 25 of a attaching and detaching type is used, the connectors 26 and 34 are likely to be disconnected. Further, in the above-described embodiment, the description has been made about a case where the refrigerating room 5 is configured by the two doors 7A and 7B of the double door type and the IT adaptor 25 is provided in the vicinity of the hinge portion 16 of the right door 7B. However, even in a case where the door is a single swing type, the same operational effect can be obtained by providing the IT adaptor 25 in the vicinity of the hinge portion.

Since the storage portion 33 mounted with the IT adaptor 25 is provided in the hinge cover 30 covering the hinge portion 16, the IT adaptor 25 can be easily disposed in the vicinity of the hinge portion 16. In addition, the connection lines 23A and 23B are led out to the surrounding portion 32 of the hinge cover 30, and the connection lines 23B and the IT adaptor 25 are connected through the connector 26 and the connector 34, so that the connection lines 23B and the IT adaptor 25 can be easily connected. Further, in this case, the IT adaptor 25 may be mounted directly on the upper surface of the housing 2.

With the configurations of the hinge cover 30 covering the hinge portion 16, the storage portion 33 which is provided in the hinge cover 30 and stores the IT adaptor 25, and the communication unit cover 41 which covers the IT adaptor 25 stored in the storage portion 33, the hinge portion 16 and the IT adaptor 25 are not exposed. Therefore, a visibility can be made excellent, and it is possible to prevent that the user unexpectedly touches the configurations. Since the communication unit cover 41 is further configured to cover the connection line lead-out portion 22 through which the connection lines 23 are led out, it is also possible to prevent that the connection lines 23 are exposed.

Further, in a case where the IT adaptor 25 is directly mounted on the upper surface of the housing 2 by a double-sided adhesive tape without providing the storage portion 33 in the hinge cover 30, the hinge cover may be configured to cover both the connection line lead-out portion 22 and the IT adaptor 25.

The IT adaptor 25 is positioned on the rear side of the hinge portion 16. With this configuration, the IT adaptor 25 is hardly visible from the front side, it is inconspicuous. Further, in a case where the IT adaptor 25 is positioned on the left side of the hinge portion 16 in the upper surface of the housing 2, the IT adaptor 25 is difficult to be hid by the hinge cover 30 and easily stands out.

The connection line lead-out portion 22 is positioned between the hinge portion 16 and the IT adaptor 25. Since the connection line lead-out portion 22 is formed in the opening 19 on the upper surface of the housing 2, it is desirably provided in the end portion of the upper surface of the housing 2 on the rear side of the hinge portion 16.

The connection lines 23 in the hinge unit 9 include the connection lines 23B connected to the IT adaptor 25 and the connection lines 23A derived to the door 7B. The connection lines 23A and 23B are divided into the front and rear sides (that is, the side toward the IT adaptor 25 and the side toward the hinge portion 16) in the connection line lead-out portion 22 between the hinge portion 16 and the IT adaptor 25. Therefore, the connection lines 23A and 23B led out to the connection line lead-out portion 22 can be appropriately wired toward the front and rear sides.

Since the wireless communication unit 35 of the IT adaptor 25 is positioned above the upper surface of the housing 2, it is possible to prevent that the wireless communication of the wireless communication unit 35 is hindered by the housing 2. In addition, the aluminum foil 15 of the metal member is provided in the storage recess 21 of the connection line lead-out portion 22. However, since the aluminum foil 15 is positioned on the lower side of the wireless communication unit 35 and does not cover the wireless communication unit 35, it is possible to prevent that the wireless communication of the wireless communication unit 35 is hindered by the metal aluminum foil 15.

Since the wireless communication unit 35 in the IT adaptor 25 is positioned above the hinge portion 16, it is also possible to prevent that the wireless communication of the wireless communication unit 35 is hindered by the metal hinge portion 16. Since the adaptor cover portion 43 of the communication unit cover 41 covering the IT adaptor 25 protrudes upward from the hinge portion 16, the wireless communication unit 35 of the IT adaptor 25 can be more easily disposed at a position above the hinge portion 16.

Since the display portion 44 for displaying that the IT adaptor 25 is stored is provided in the upper surface of the adaptor cover portion 43 of the communication unit cover 41 covering the IT adaptor 25, the operator or the user can easily know by viewing the display portion 44.

The connector 34 of the IT adaptor 25 is positioned above the upper surface of the housing 2. Therefore, even in a case where the water flows to the upper surface of the housing 2, it is possible to prevent that the water comes into contact with the connector 34.

Since the step portions 36 and the engaging claws 37 are provided as the mounting regulation member for positioning the wireless communication unit 35 of the IT adaptor 25 to face upward in a case where the IT adaptor 25 is mounted in the storage portion 33, the IT adaptor 25 can be mounted in a state that the wireless communication unit 35 reliably faces upward. Therefore, it is possible to reliably perform the communication by the wireless communication unit 35 compared to a case where the IT adaptor 25 is mounted in a state that the wireless communication unit 35 faces downward.

The detachable connector cover 27 is provided in the connector 26 of the connection lines 23B for the connection of the IT adaptor 25. In a case where the IT adaptor 25 is not provided in the refrigerator 1, the connector 26 of the connection lines 23B is stored in the storage recess 21. In this case, the terminal of the connector 26 is prevented from being exposed by providing the connector cover 27 to the connector 26. Therefore, it is possible to reliably prevent that the terminal of the connector 26 comes into contact with the metal aluminum foil 15 or the hinge portion 16.

The metal line 28 for noise prevention is provided in the connection lines 23B for the connection of the IT adaptor 25, and the earth line 28a connected to the metal line 28 is connected to the metal hinge portion 16. Therefore, it is possible to prevent the occurrence of noises on the connection lines 23B. In addition, such a configuration can be easily achieved by disposing the IT adaptor 25 in the vicinity of the hinge portion 16. In addition, the metal line may be disposed within a coated material of the connection lines 23B. In this case, the earth line 28a may be connected to the connector 26.

The water infiltration prevention member is provided for the connection line lead-out portion 22. In this case, as the water infiltration prevention member, there are the peripheral wall 18a surrounding the connection line lead-out portion 22 in the connection line lead-out member 18, the surrounding portion 32 surrounding the peripheral wall 18a, and the connection portion 39 formed in the mountain shape. With these configurations, it is possible to prevent the water from being infiltrated into the connection line lead-out portion 22. The storage portion 33 storing the IT adaptor 25 is formed in a vessel shape, so that the peripheral side wall 33a also serves as the water infiltration prevention member for the IT adaptor 25.

The refrigerating room 5 includes the two doors 7A and 7B of the double door type, the heater connection line 23D passes to the hinge unit 8 of the left door 7A in these two doors 7A and 7B, and the IT adaptor 25 is provided in the vicinity of the hinge unit 9 of the right door 7B where the heater connection line 23D does not pass. With this configuration, there is an advantage that the IT adaptor 25 is hardly affected by the noises from the heater connection line 23D.

In addition, the operation panel 11 equipped with the electrostatic switch 12 is provided in the left door 7A in the two doors 7A and 7B of the refrigerating room 5, and the IT adaptor 25 is provided in the vicinity of the hinge unit 9 of the right door 7B where the electrostatic switch 12 is not provided. With this configuration, it is possible to reliably prevent that the communication performed by the IT adaptor 25 adversely affects the electrostatic switch 12.

The floating prevention member is provided between the hinge cover 30 and the communication unit cover 41 in order to prevent the communication unit cover 41 from floating upward against the hinge cover 30. In this case, the engagement holes 40, the projections 47, and the depression 49 in the hinge cover 30, and the engaging claws 45, the projections 46, and the projections 48 in the communication unit cover 41 are provided as the floating prevention member. The communication unit cover 41 is formed in a longitudinal shape extending in the front and rear direction, and the floating easily occurs at the time of mounting. However, it is possible to reliably prevent that the communication unit cover 41 floats upward by providing the floating prevention member at three places front and back of the communication unit cover 41.

The communication unit cover 41 includes the slipping prevention portions 51 for the attaching/detaching operation in its outer side surfaces. The slipping prevention portions 51 are formed by two beads which are extended in the vertical direction, and extended down to the lower ends of the outer side surfaces of the communication unit cover 41. With this configuration, when the communication unit cover 41 is formed by a molding die, a mating surface between an upper die and a lower die is set to be in the lower ends of the slipping prevention portions 51 (that is, the lower ends of the right and left side walls of the communication unit cover 41), so that the mating surface (that is, a parting line) of the dies is not left in the intermediate portions of the outer surfaces of the right and left side walls of the communication unit cover 41.

The hinge cover 30 covering the hinge portion 16, and the communication unit cover 41 covering the connection line lead-out portion 22 and the IT adaptor 25 are provided, and both these covers are formed to be gradually expanded in the width as it goes from the hinge portion 16 to the IT adaptor 25. With this configuration, it is possible not to form large step portions in the hinge cover 30 and the communication unit cover 41, and there is an advantage of a good visibility. Further, the components from the hinge portion 16 to the IT adaptor 25 may be integrally covered by one cover. In addition, the expanding direction of the cover is not limited to the width direction (lateral direction) from the hinge portion 16 to the IT adaptor 25, and may be a height direction.

The IT adaptor 25 is disposed at a position where a distance H1 between the wireless communication unit 35 (antenna) and the upper surface of the metal outer case 3 (serving as the upper surface of the housing 2) becomes 10 mm. In a case where the distance between the wireless communication unit 35 and the metal (the outer case 3) is set to a distance (that is, 60 mm, 120 mm, 180 mm, or the like) corresponding to the multiples of a half of a wavelength λ (about 120 mm) of a radio wave (2.5 GHz band) handled by the wireless communication unit 35, the incident wave and the reflected wave of the radio wave are cancelled out and thus the electric wave is not transmitted. With this regard, in this embodiment, the distance H1 between the wireless communication unit 35 and the upper surface of the housing 2 is set to 10 mm which does not correspond to the above numerical values, so that it is possible to prevent that the electric wave is not transmitted. In particular, in this embodiment, since the distance H1 is set to 10 mm which is less than a half of the wavelength λ, it is possible to prevent that the IT adaptor 25 significantly protrudes upward, and to achieve a desirably design.

Besides, when the distance H1 is set to 30 mm which corresponds to a quarter of the wavelength λ, the phases of the incident wave and the reflective wave of the radio wave are likely to be overlapped to each other so as to be multiplied, so that it can be expected that communication performance is more enhanced. In addition, the above effect can be obtained when other radio waves are used. For example, the same effect can be obtained in the 2.4 GHz (wavelength: 125 mm) band and the 5 GHz (wavelength: 60 mm) band and the like.

(Second Embodiment)

Figure 10:
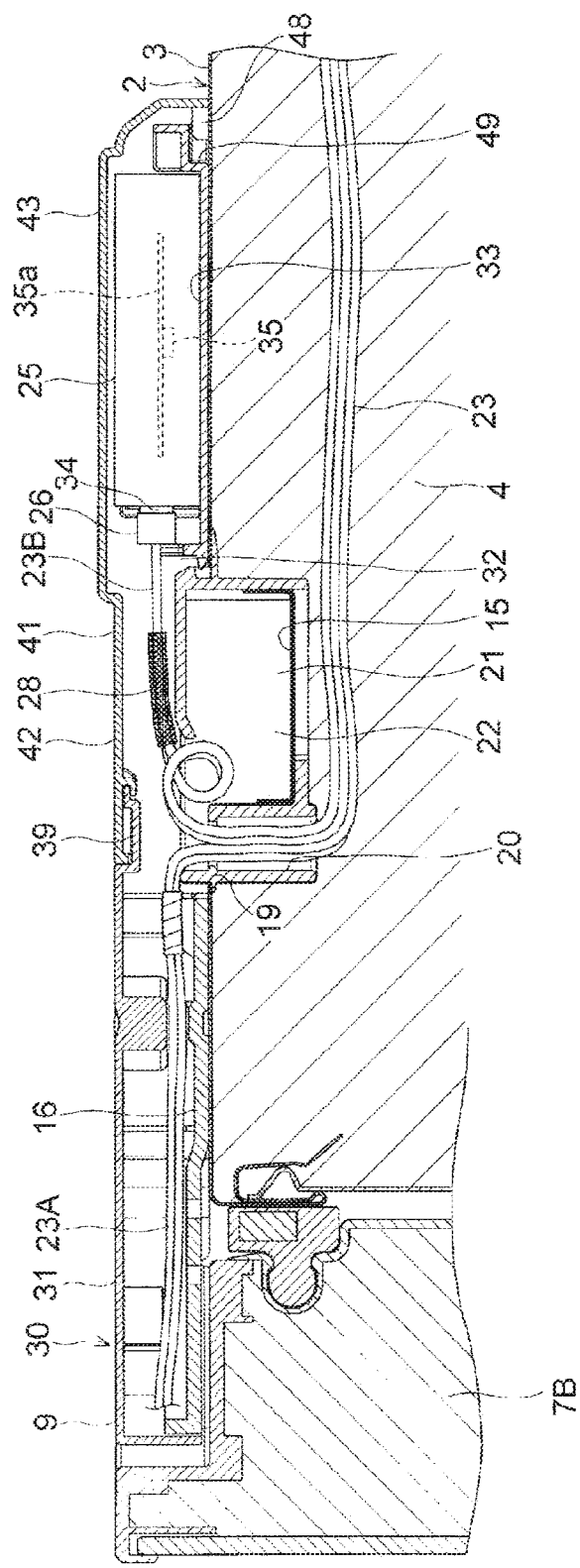
FIG. 10 is a diagram illustrating a second embodiment corresponding to of FIG. 6.

A second embodiment will be described with reference to FIG. 10. In the second embodiment, the description will be made about a case where the configuration for mounting the IT adaptor 25 in the storage portion 33 is not provided with an engaging claw 37 which serves as the mounting regulation means for positioning the wireless communication unit 35 of the IT adaptor 25 to face upward. In such a case, the IT adaptor 25 may be mounted in the storage portion 33 in a state where the wireless communication unit 35 faces downward as illustrated in FIG. 10. Even in a case where the IT adaptor 25 is mounted to be inversed in the vertical direction, the connector 34 in the front surface portion is positioned above the upper surface of the housing 2. Therefore, even when the water flows on the upper surface of the housing 2, it is possible to prevent the water from coming contact with the connector 34. Even in a case where the IT adaptor 25 is directly mounted on the upper surface of the housing 2 without the storage portion 33, the same effect is achieved.

(Third Embodiment)

Figure 11A:
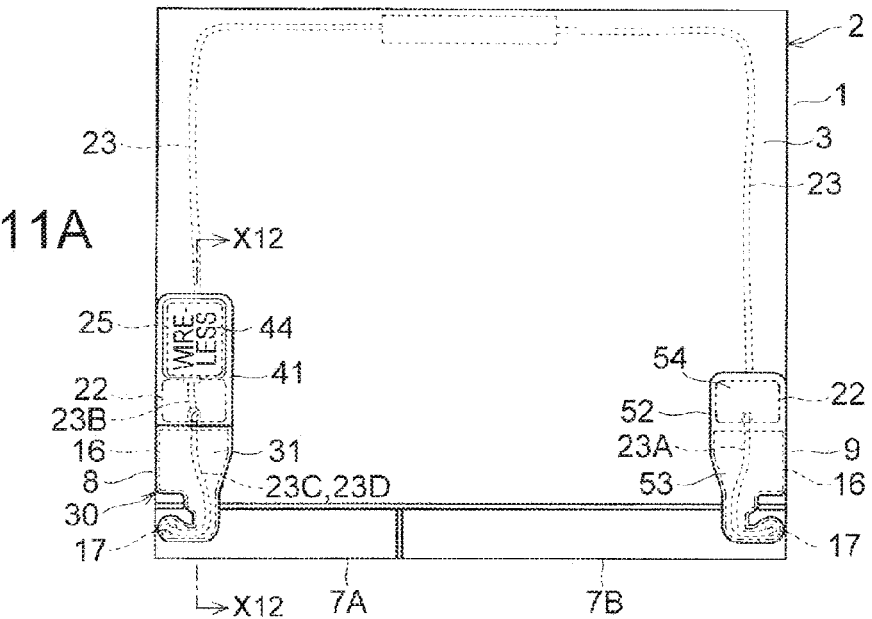
FIGS. 11A and 11B are diagrams illustrating a third embodiment corresponding to FIGS. 1A and 1B.
Figure 11B:
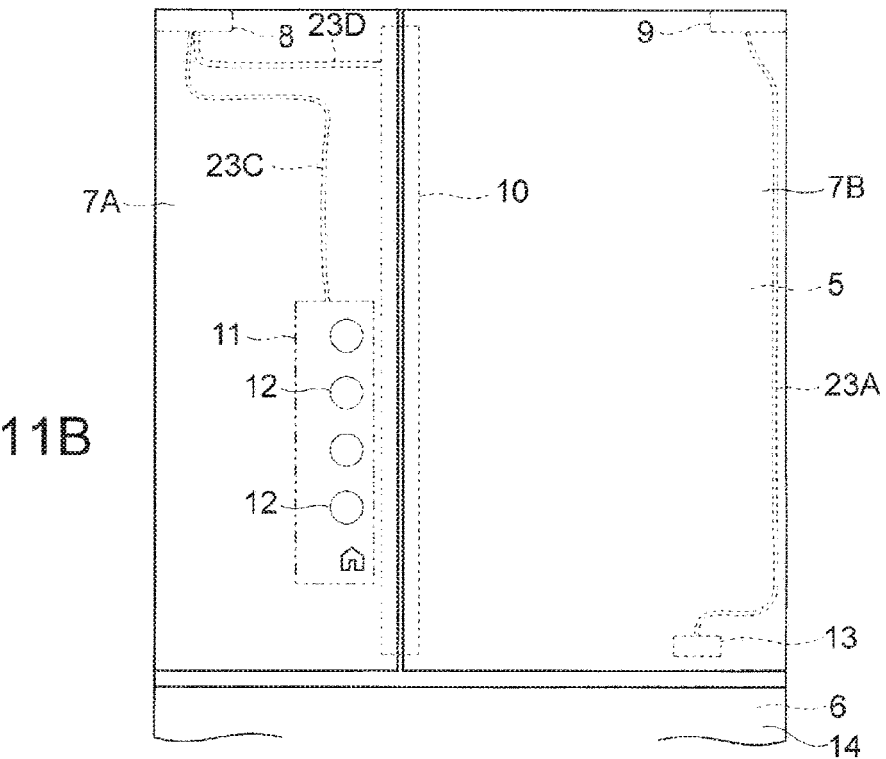
Figure 12:
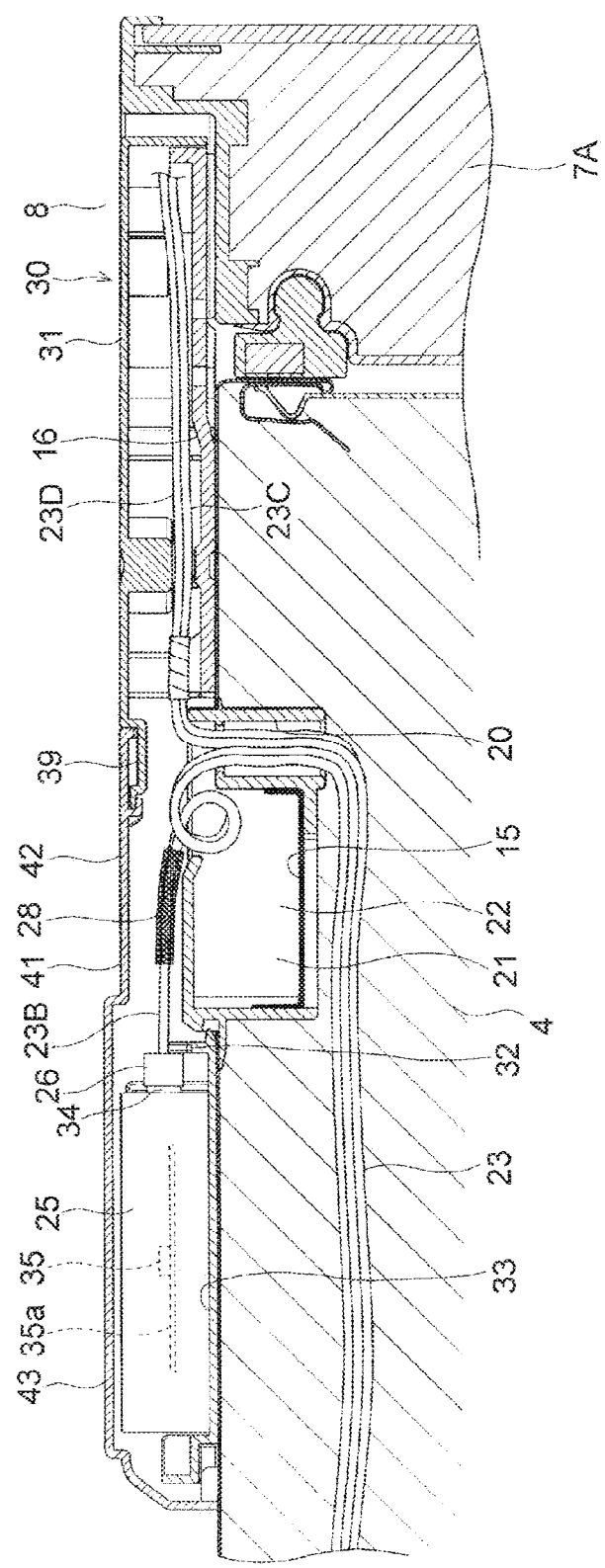
FIG. 12 is a cross-sectional side view taken along line X12-X12 in FIG. 11A.

A third embodiment will be described with reference to FIGS. 11 and 12. In the third embodiment, the IT adaptor 25 serving as the wireless communication apparatus is not provided in the hinge unit 9 of the right upper portion, but is provided in the vicinity of the hinge unit 8 of the left upper portion. The hinge unit 8 of the left upper portion supports the left door 7A having a small width dimension in the right and left two doors 7A and 7B. Similarly to the hinge cover 30 of the first embodiment, the hinge cover portion 31, the surrounding portion 32 surrounding the connection line lead-out portion 22, and the storage portion 33 storing the IT adaptor 25 are integrally provided in the hinge cover 30. In the connection line lead-out portion 22, the connection lines 23 of which the one ends are connected to the control device 24 are led out. In this case, the connection lines 23 include the connection lines 23B for the connection of the IT adaptor 25, the connection lines 23C for the operation panel 11, and the heater connection line 23D.

In the connection line lead-out portion 22, the connection lines 23B for the connection of the IT adaptor 25 are led to the IT adaptor 25, and the connector 26 of the leading end is connected to the connector 34 of the IT adaptor 25. The other connection lines 23 (the connection lines 23C for the operation panel 11 and the heater connection line 23D) are led to the hinge portion 16, and inserted in the hinge shaft 17. At this time, in the storage recess 21, the aluminum foil 15 provided in the storage recess 21 is positioned between the heater connection line 23D and the heat-insulating member 4. Besides, the hinge portion 16 of the right hinge unit 9 and the connection line lead-out portion 22 are covered by the hinge cover 52 similarly to the left hinge unit 8 of the first embodiment.

According to the above-described embodiment, the following effects are achieved.

The IT adaptor 25 is provided in the vicinity of the hinge unit 8 of the left door 7A of which the width dimension is small in the two doors 7A and 7B of the double door type. According to this configuration, since the weight of the left door 7A of the small width dimension is smaller than that of the right door 7B, a shock applied to the IT adaptor 25 can be more reduced when the door 7A is closed.

In the connection line lead-out portion 22, the heater connection line 23D for 100 V is included in the connection lines 23, and the aluminum foil 15 is provided in the inner surface of the storage recess 21 to prevent fire spread from the heat-insulating member 4 made of a heat-insulating foam material. Even in this case, since the aluminum foil 15 is provided below the upper surface of the housing 2, it is possible to prevent that the metal aluminum foil 15 adversely affects the wireless communication of the wireless communication unit 35.

(Fourth Embodiment)

Figure 13:
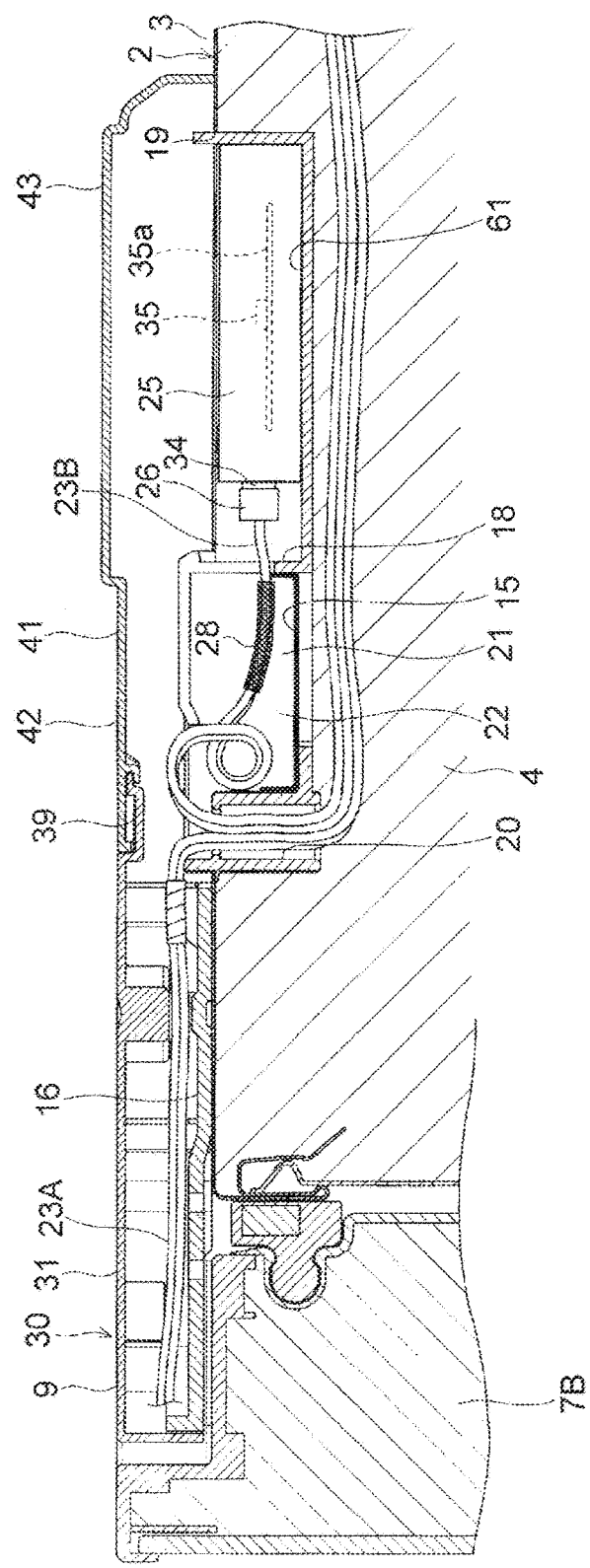
FIG. 13 is a diagram illustrating a fourth embodiment corresponding to FIG. 6.

A fourth embodiment will be described with reference to FIG. 13. The fourth embodiment is different from the above-described first embodiment in the following points. That is, a storage portion 61 of a vessel shape is integrally provided in the rear portion of the connection line lead-out member 18, and the storage portion 61 is also fitted into the opening 19 of the outer case 3 from the upside. Therefore, the bottom surface of the storage portion 61 is positioned below the upper surface of the outer case 3. Then, the IT adaptor 25 is disposed to be stored in the storage portion 61, and the connector 34 of the IT adaptor 25 and the connector 26 of the connection lines 23B are connected.

(Fifth Embodiment)

Figure 14:
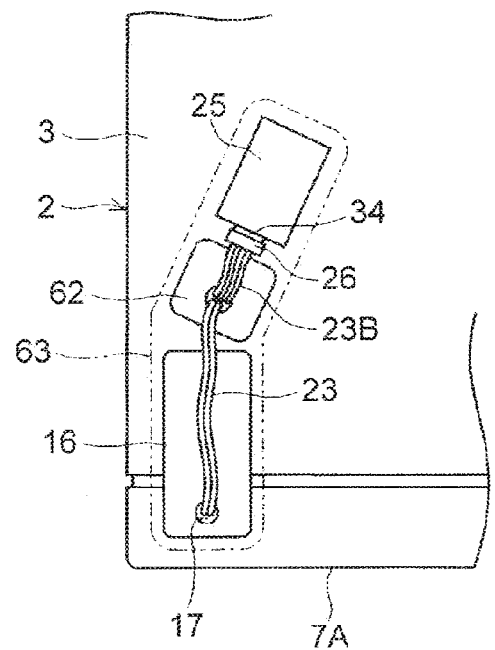
FIG. 14 is a plan view illustrating the vicinity of a hinge unit in the left upper portion of the refrigerator according to a fifth embodiment.

A fifth embodiment will be described with reference to FIG. 14. FIG. 14 schematically illustrates an example in which the IT adaptor 25 is provided in the vicinity of the hinge portion 16 of the left door 7A. In the upper surface of the housing 2, a connection line lead-out portion 62 leading out the connection lines 23 is disposed obliquely on the right so as to be positioned on the rear side of the hinge portion 16 and in the inner side (in this case, the right side) of the hinge portion 16 when viewed from the front side. The IT adaptor 25 is disposed to be positioned on a line extending to the rear side of the connection line lead-out portion 62. In other words, the IT adaptor 25 is disposed obliquely on the right side from the hinge portion 16.

In the connection lines 23 led out to the connection line lead-out portion 62, the connection lines 23 of the door 7A side are derived to the hinge portion 16 and inserted to the hinge shaft 17, and the connection lines 23B for the IT adaptor 25 are led to the IT adaptor 25 and connected to the IT adaptor 25 through the connectors 26 and 34. Then, the hinge portion 16, the connection line lead-out portion 22, and the IT adaptor 25 are integrally covered by a cover 63. Further, the cover 63 may be divided into two parts.

(Sixth Embodiment)

Figure 15:
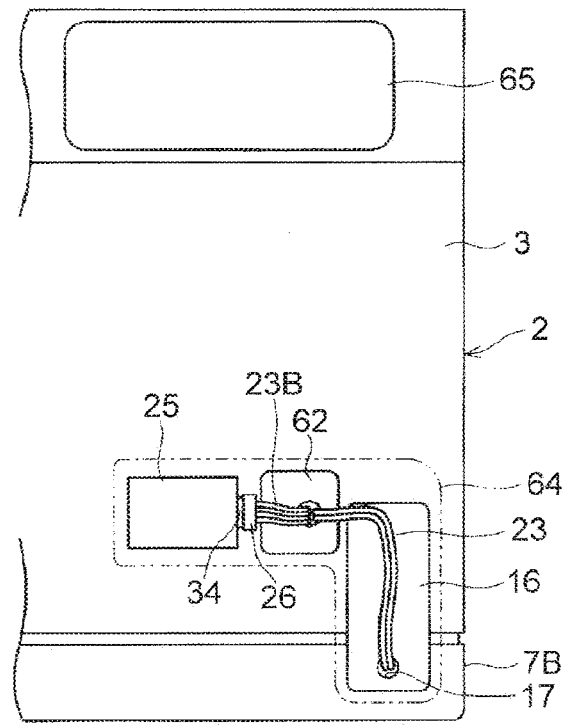
FIG. 15 is a plan view illustrating the vicinity of the hinge unit in the right upper portion of the refrigerator according to a sixth embodiment.

A sixth embodiment will be described with reference to FIG. 15. FIG. 15 schematically illustrates an example in which the IT adaptor 25 is provided in the vicinity of the hinge portion 16 of the right door 7B. In the upper surface of the housing 2, the connection line lead-out portion 62 is provided on the left side of the hinge portion 16. The IT adaptor 25 is positioned on the left side of the connection line lead-out portion 62, and is disposed in the lateral direction to be parallel to the door 7B. The connector 34 faces the right side. In the connection lines 23 led out to the connection line lead-out portion 62, the connection lines 23 of the door 7A side are led out to the hinge portion 16 and inserted to the hinge shaft 17, and the connection lines 23B for the IT adaptor 25 are disposed to face the IT adaptor 25 and connected to the IT adaptor 25 through the connectors 26 and 34. Then, the hinge portion 16, the connection line lead-out portion 62, and the IT adaptor 25 are integrally covered by a cover 64. The cover 64 is formed in an L shape (when viewed from the above) to be along the arrangement of the hinge portion 16, the connection line lead-out portion 22, and the IT adaptor 25. A compressor 65 of a refrigerating cycle is disposed in the ceiling part of the rear portion of the housing 2.

In this case, the connection line lead-out portion 62 and the IT adaptor 25 each are disposed in the depressions of the ceiling part of the housing 2, the connection line lead-out portion 62 and the IT adaptor 25 may be disposed in one depression.

(Seventh Embodiment)

Figure 16:
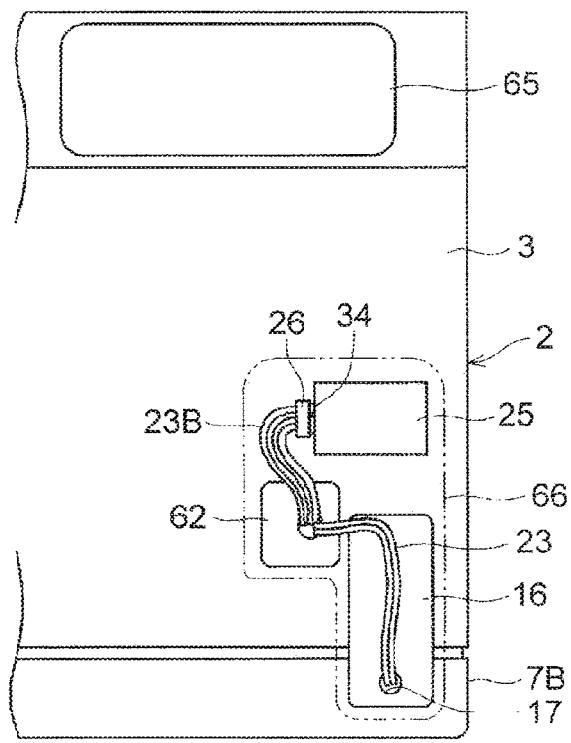
FIG. 16 is a diagram illustrating of a seventh embodiment corresponding to FIG. 15.

A seventh embodiment will be described with reference to FIG. 16. The seventh embodiment is different from the above-described sixth embodiment in the following points. That is, the IT adaptor 25 is positioned on the rear side of the hinge portion 16 and the connection line lead-out portion 62 in the upper surface of the housing 2 so as to be wrapped by the hinge portion 16 and the connection line lead-out portion 62 when viewed from the front side. The IT adaptor 25 is disposed such that the connector 34 faces the left side, and is disposed to be parallel to the door 7B.

Then, the hinge portion 16, the connection line lead-out portion 62, and the IT adaptor 25 are integrally covered by a cover 66. The cover 66 is formed in the L shape (when viewed from the above) to be along the arrangement of the hinge portion 16, the connection line lead-out portion 62, and the IT adaptor 25.

(Eighth Embodiment)

Figure 17:
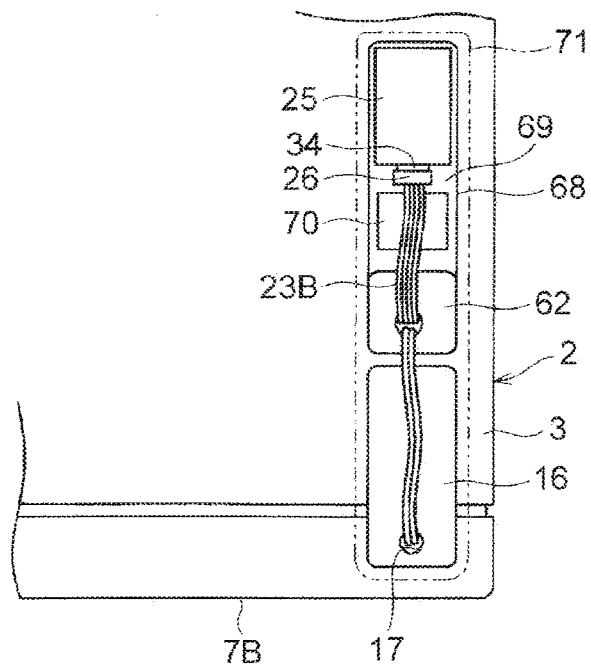
FIG. 17 is a plan view illustrating the vicinity of the hinge unit in the right upper portion of the refrigerator according to an eighth embodiment.

An eighth embodiment will be descried with reference to FIG. 17. The eighth embodiment has the following features. In the upper surface of the housing 2, a mounting member 68 as a part for forming the connection line lead-out portion 62 is provided on the rear side of the hinge portion 16 of the right door 7B. The mounting member 68 includes the connection line lead-out portion 62 and a storage portion 69, and made of a synthetic resin for example. The storage portion 69 is positioned on the rear side of the connection line lead-out portion 62, and a wiring board 70 and the IT adaptor 25 are stored in the storage portion 69. In this case, the IT adaptor 25 is positioned on the rear side of the wiring board 70, and disposed in a state where the connector 34 faces the front side. The hinge portion 16, the connection line lead-out portion 62, the wiring board 70, and the IT adaptor 25 are disposed in a straight-line shape in the front and rear direction. Then, the hinge portion 16, the connection line lead-out portion 62, the wiring board 70, and the IT adaptor 25 are integrally covered by a cover 71. The cover 71 is formed in the straight-line shape (when viewed from the above) to be along the arrangement of the hinge portion 16, the connection line lead-out portion 62, the wiring board 70, and the IT adaptor 25. The wiring board 70 is provided with a temperature sensor and a humidity sensor, and the control is made on the inside of a refrigerator based on these detected values. In addition, a surrounding environment for operating the IT adaptor 25 may be informed base on these detected values.

(Ninth Embodiment)

Figure 18:
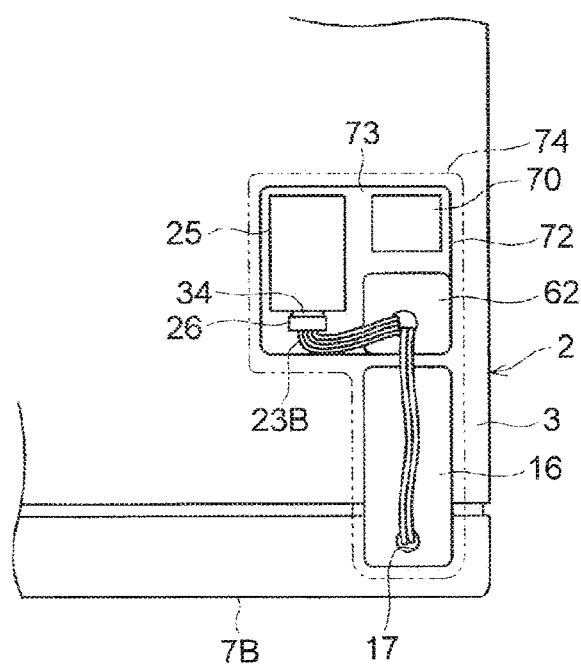
FIG. 18 is a diagram illustrating a ninth embodiment corresponding to FIG. 17.

A ninth embodiment will be described with reference to FIG. 18. The ninth embodiment is different from the above-described eighth embodiment in the following points. That is, a mounting member 72 forming the connection line lead-out portion 62 includes a storage portion 73 in the surrounding area of the connection line lead-out portion 62. In the storage portion 73, the wiring board 70 is disposed on the rear side of the connection line lead-out portion 62, and the IT adaptor 25 is disposed on the left side of the connection line lead-out portion 62 and the wiring board 70. Therefore, the IT adaptor 25 is disposed in the inner side from the wiring board 70 when viewed from the front side. Then, the hinge portion 16, the connection line lead-out portion 62, the wiring board 70, and the IT adaptor 25 are integrally covered by a cover 74. The cover 74 is formed in the L shape (when viewed from the above) to be along the arrangement of the hinge portion 16, the connection line lead-out portion 62, the wiring board 70, and the IT adaptor 25.

(Tenth Embodiment)

Figure 19:
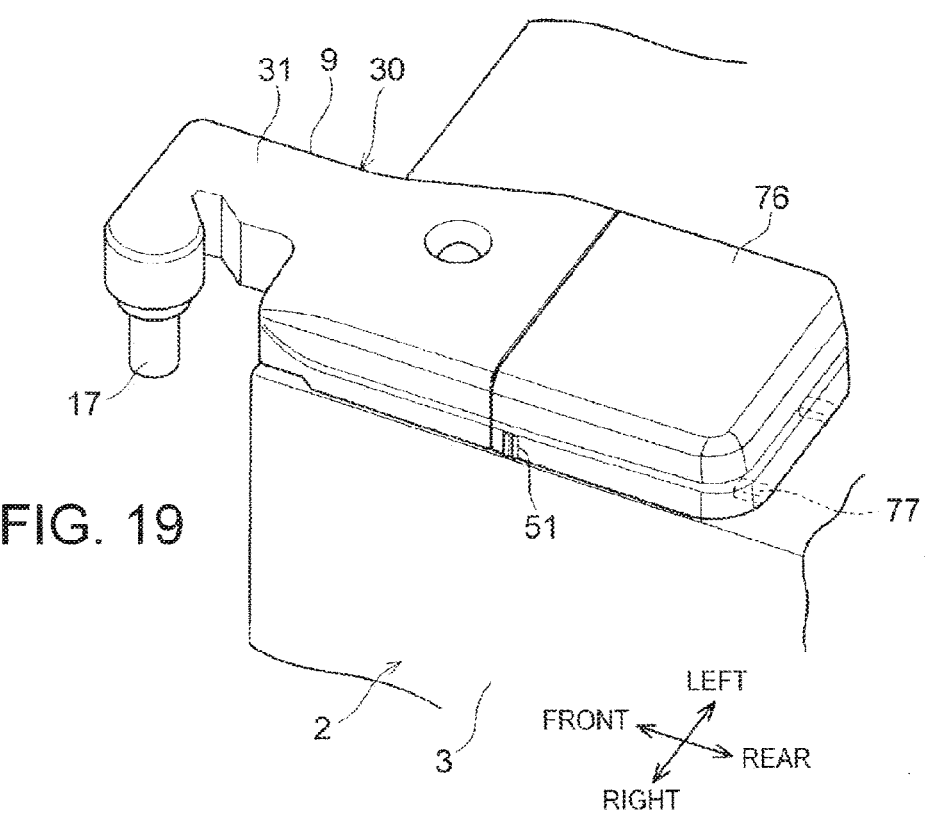
FIG. 19 is a perspective view illustrating the vicinity of the hinge unit in the right upper portion in a state where the IT adaptor is mounted according to a tenth embodiment.
Figure 20:
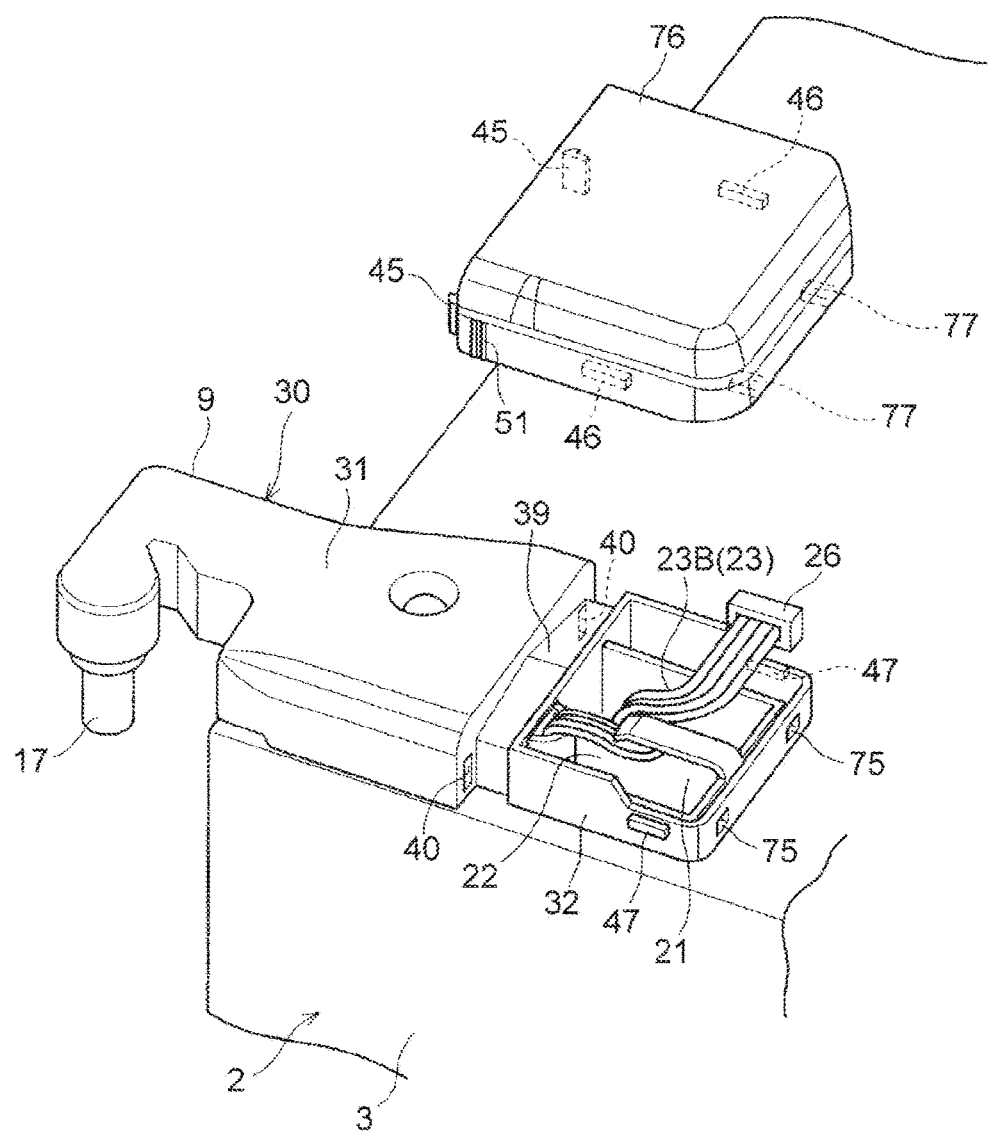
FIG. 20 is a perspective view in a state where a lead-out portion cover is removed in FIG. 19.
Figure 21:
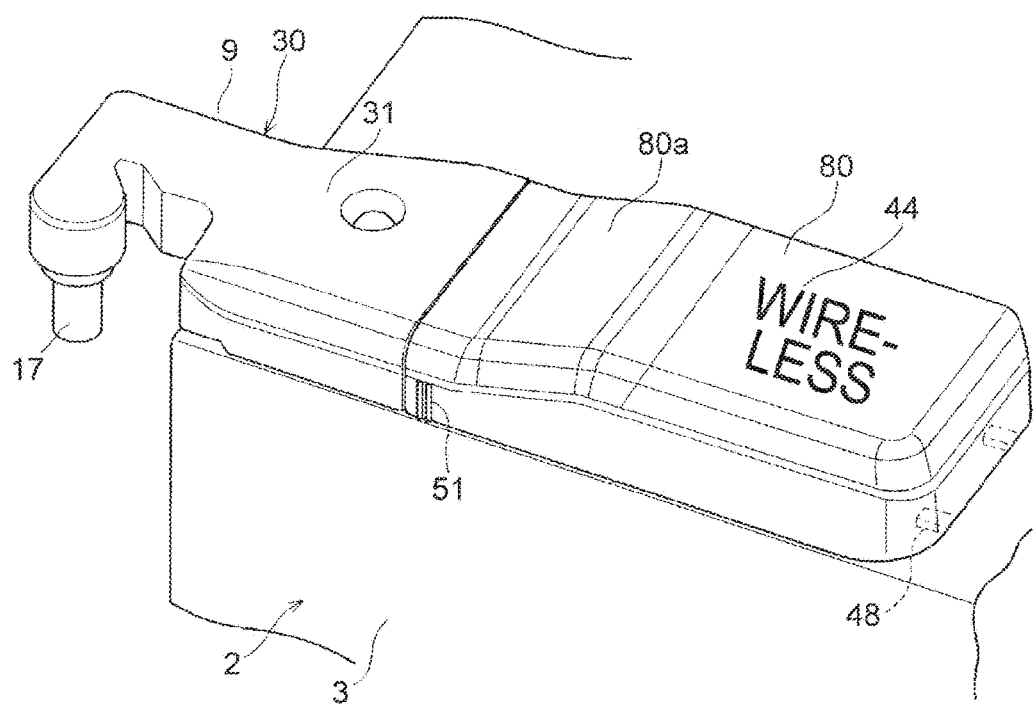
FIG. 21 is a perspective view illustrating the vicinity of the hinge unit in the right upper portion in a state where the IT adaptor is mounted.
Figure 22:
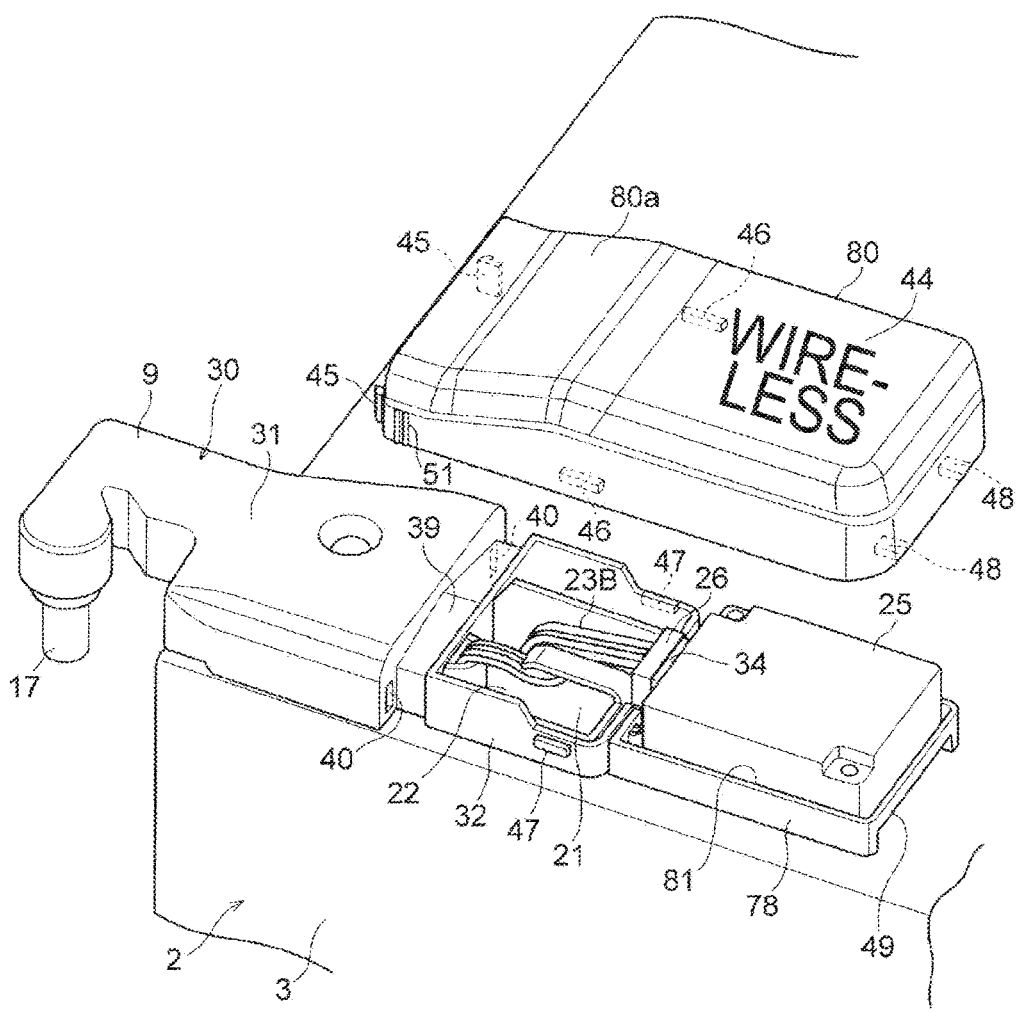
FIG. 22 is a perspective view in state where the communication unit cover is removed in FIG. 21.

A tenth embodiment will be described with reference to FIGS. 19 to 22. FIGS. 19 and 20 in FIGS. 19 to 22 illustrate a case where the IT adaptor 25 is not provided in the vicinity of the hinge unit 9 of the right upper portion, and FIGS. 21 and 22 illustrate a case where the IT adaptor 25 is provided. Besides, the two doors 7A and 7B are omitted in FIGS. 19 to 22.

First, in FIGS. 19 and 20, the surrounding portion 32 is integrally provided in the hinge cover 30 on the rear side of the hinge cover portion 31 covering the hinge portion 16 (see FIG. 3) through the connection portion 39, but the storage portion 33 is not provided. In the connection line lead-out portion 22 in the surrounding portion 32, the connection lines 23 are led out. The connection lines 23A on a side near the door 7B (not illustrated) among the connection lines 23 are led out to the hinge cover portion 31. Then, the connection lines 23B for the IT adaptor 25 are stored in the storage recess 21 to be freely put in and out. Holes 75 are formed at two places in the rear surface of the enveloping portion 32. In the rear surface of the hinge cover portion 31, the engagement holes 40 are formed to be positioned on both the right and left sides of the connection portion 39 similarly to the first embodiment. In addition, the projections 47 are formed in both side surfaces on the right and left sides of the surrounding portion 32.

In the connection line lead-out portion 22, a lead-out portion cover 76 is detachably mounted. The lead-out portion cover 76 is a first cover which covers the connection line lead-out portion 22. In the lead-out portion cover 76, the engaging claws 45 engaged with the engagement holes 40 are provided in the front portion, the projections 46 corresponding to the projections 47 are provided in the inner surface of the right and left side walls, and projections 77 corresponding to the holes 75 are provided in the rear portion to face forward. In addition, the slipping prevention portions 51 are also provided in the front portion of both outer surfaces on the right and left sides of the lead-out portion cover 76.

When the lead-out portion cover 76 is mounted on the upper surface of the hinge cover 30, the operator grips the lead-out portion cover 76 while holding the right and left slipping prevention portions 51 using fingers, and slides the lead-out portion cover 76 forward with respect to the hinge cover 30, so that the right and left engaging claws 45 are engaged with the engagement holes 40 and each inserted in the holes 75 corresponding to the projections 77 of the rear portion. At this time, the right and left projections 46 of the lead-out portion cover 76 go into the lower side of the projections 47 of the surrounding portion 32. Therefore, the lead-out portion cover 76 can be mounted in the upper surface of the hinge cover 30 in a state where the floating is prevented.

In addition, in a case where the lead-out portion cover 76 is removed from the hinge cover 30, similarly to the case of the communication unit cover 41 of the first embodiment, the operator slides the lead-out portion cover 76 backward while pressing the slipping prevention portions 51 inward to elastically deform the engaging claws 45 inward in the state of holding the right and left slipping prevention portions 51 using fingers, so that the engagement between the engaging claws 45 and the engagement holes 40 can be released. Therefore, the lead-out portion cover 76 can be removed from the hinge cover 30.

In a case where the IT adaptor 25 is provided with respect to the hinge unit 9 of the above configuration, as illustrated in FIG. 22, the IT adaptor 25, an adaptor fixing tool 78 storing the IT adaptor 25, and a communication unit cover 80 having the same configuration as that of the first embodiment are prepared. The adaptor fixing tool 78 is made of, for example, a synthetic resin and formed in a rectangular vessel shape, and includes a storage portion 81 therein. The IT adaptor 25 is stored and fixed in the storage portion 81. The adaptor fixing tool 78 fixing the IT adaptor 25 is positioned on the rear side of the surrounding portion 32 with the hinge cover 30 as a reference, and in this state, mounted in a fixed state on the upper surface of the housing 2 (the outer case 3) by a double-sided adhesive tape for example. The depression 49 of which the rear surface is open is formed in the rear portion of the adaptor fixing tool 78.

The communication unit cover 80 is formed similarly to the communication unit cover 41 of the first embodiment except that the shape of the upper surface is slightly different. The communication unit cover 80 forms a second cover which simultaneously covers the connection line lead-out portion 22 (the surrounding portion 32) and the IT adaptor 25. The communication unit cover 80 includes the engaging claws 45 in the front portions of both the right and left side walls, the slipping prevention portions 51 in the front portions of both the right and left side surfaces, the projections 46 in the inner surfaces of both the right and left side walls, and the projections 48 facing forward in the rear portion. The upper surface of the communication unit cover 80 is provided with an inclined portion 80a of which the height is gradually increased as it goes from the hinge portion 16 to the IT adaptor 25 so as to be gradually expanded as it goes toward the IT adaptor 25. Besides, the display portion 44 indicating "Wireless" is provided above the IT adaptor 25 in the upper surface of the communication unit cover 80.

The communication unit cover 80 is mounted with respect to the hinge cover 30 as follows. The communication unit cover 80 is positioned slightly behind the upper surface of the surrounding portion 32 and the IT adaptor 25, and in this state slid forward. At this time, the projections 46 of the communication unit cover 80 go into the lower side of the projections 47 of the surrounding portion 32, and the projections 48 of the communication unit cover 80 go into the depression 49 of the rear portion of the adaptor fixing tool 78 from the rear side. Then, the engaging claws 45 on both the right and left sides of the front portion of the communication unit cover 80 are engaged with the engagement holes 40 of the hinge cover portion 31. Therefore, the communication unit cover 80 is attached to the hinge cover 30 while preventing that the cover floats upward with respect to the hinge cover 30 (FIG. 21).

In this case, the engagement holes 40 of the hinge cover 30 constitute cover mounting portions with which the lead-out portion cover 76 (the first cover) covering the connection line lead-out portion 22 and the communication unit cover 80 (the second cover) simultaneously covering the connection line lead-out portion 22 and the IT adaptor 25 can be mounted. Besides, in this embodiment, the metal line 28 and the earth line 28a for noise prevention are not provided in the connection lines 23B, but it is desirably to provide these lines.

(Other Embodiments)

In the above-described embodiment, the description has been made about an example where the two doors 7A and 7B of the double door type are provided as the door of the refrigerating room 5, however, the invention can be applied to the case of a single door type. Even in this case, the IT adaptor 25 is provided in the vicinity of the hinge portion which supports the door.

As described above, according to the refrigerator of this embodiment, the wireless communication apparatus is connected to the connection lines led out to the vicinity of the hinge portion, so that the wireless communication apparatus and the lines can be easily layout.

While certain embodiments have been described, these embodiments have been presented by way of example only, and are not intended to limit the scope of the inventions. Indeed, the novel embodiments described herein may be embodied in a variety of other forms; furthermore, various omissions substitutions and changes in the form of the embodiments described herein may be made without departing from the spirit of the inventions. The accompanying claims and their equivalents are intended to cover such forms or modifications as would fall within the scope and spirit of the inventions.

REFERENCE SIGNS LIST 1 refrigerator
2 housing
3 outer case
4 heat-insulating member (heat-insulating foam material)
5 refrigerating room (storeroom)
7A, 7B door (door of double door type)
8, 9 hinge unit
11 operation panel
12 electrostatic switch
15 aluminum foil (metal member)
16 hinge portion
17 hinge shaft
18 connection line lead-out member
18a peripheral wall (water infiltration prevention member)
22 connection line lead-out portion
23 connection line
24 control device
25 IT adaptor (wireless communication apparatus)
26 connector
27 connector cover 28a earth line
30 hinge cover
32 surrounding portion (connection line lead-out portion, water infiltration prevention member)
33 storage portion (mounting portion)
33a side wall (water infiltration prevention member)
34 connector
35 wireless communication unit
35a wiring board
36 step portion (mounting regulation member)
37 engaging claw (mounting regulation member)
39b inclined portion (water infiltration prevention member)
40 engagement hole (floating prevention member, cover mounting portion)
41 communication unit cover
44 display portion
45 engaging claw (floating prevention member)
46, 47, 48 projection (floating prevention member)
49 depression (floating prevention member)
51 sliding prevention portion
52 hinge cover
56 router
57 Internet
59 mobile terminal
61 storage portion
62 connection line lead-out portion
63 cover
64 cover
65 compressor
66 cover
68 mounting member (member)
69 storage portion
70 wiring board
71 cover
73 storage portion
74 cover
76 lead-out portion cover (first cover)
78 adaptor fixing tool
80 communication unit cover (second cover)
81 storage portion

What is claimed is:

1. A refrigerator comprising:
a housing including a storeroom;
a door that is rotatably provided in the housing through a hinge portion and configured to open and close an opening of the storeroom by the rotation;
a connection line that is led out to a vicinity of the hinge portion;
a wireless communication apparatus including a wireless communication unit, the wireless communication unit being connected to the connection line and disposed in the vicinity of the hinge portion; and
a metal member provided in a connection line lead-out portion through which the connection line is led out, the metal member being positioned not to cover the wireless communication unit.

2. The refrigerator according to claim 1, wherein the metal member is positioned below the wireless communication unit.

3. The refrigerator according to claim 1, wherein the wireless communication unit in the wireless communication apparatus is disposed at a position higher than the hinge portion.

4. The refrigerator according to claim 1, wherein the wireless communication apparatus is positioned on a rear side of the hinge portion.

5. The refrigerator according to claim 1, wherein a connection line lead-out portion through which the connection line is led out is positioned between the hinge portion and the wireless communication apparatus.

6. The refrigerator according to claim 5, wherein:
the connection line includes a connection line connected to the wireless communication apparatus and a connection line led out to the door side; and
the connection line connected to the wireless communication apparatus and a connection line led out to the door side are divided in the connection line lead-out portion for the wireless communication apparatus side and for the hinge portion side.

7. The refrigerator according to claim 1, wherein the wireless communication unit in the wireless communication apparatus is positioned above an upper surface of the housing.

8. A refrigerator comprising:
a housing including a storeroom and a heat-insulating foam material;
a door that is rotatably provided in the housing through a hinge portion and configured to open and close an opening of the storeroom by the rotation;
a connection line that is led out to a vicinity of the hinge portion, the connection line including a heater connection line;
a metal member positioned between the heater connection line and the heat-insulating foam material in the housing; and
a wireless communication apparatus including a wireless communication unit, the wireless communication unit being connected to the connection line.

9. The refrigerator according to claim 8, wherein the wireless communication apparatus is disposed in the vicinity of the hinge portion.

10. The refrigerator according to claim 8, wherein the wireless communication apparatus is positioned on a rear side of the hinge portion.

11. The refrigerator according to claim 8, wherein a connection line lead-out portion through which the connection line is led out is positioned between the hinge portion and the wireless communication apparatus.

12. The refrigerator according to claim 11, wherein:
the connection line includes a connection line connected to the wireless communication apparatus and a connection line led out to the door side; and
the connection line connected to the wireless communication apparatus and a connection line led out to the door side are divided in the connection line lead-out portion for the wireless communication apparatus side and for the hinge portion side.

13. The refrigerator according to claim 8, wherein the wireless communication unit in the wireless communication apparatus is positioned above an upper surface of the housing.

14. The refrigerator according to claim 8, wherein:
a metal member is provided in a connection line lead-out portion through which the connection line is led out; and
the metal member is positioned not to cover the wireless communication unit.

15. The refrigerator according to claim 8, wherein the metal member is positioned below the wireless communication unit.

16. A refrigerator comprising:
a housing including a storeroom;
a door that is rotatably provided in the housing through a hinge portion and configured to open and close an opening of the storeroom by the rotation;
a connection line that is led out to a vicinity of the hinge portion; and
a wireless communication apparatus including a wireless communication unit, the wireless communication unit being connected to the connection line and disposed in the vicinity of the hinge portion at a position higher than the hinge portion.

17. The refrigerator according to claim 16, wherein the wireless communication apparatus is positioned on a rear side of the hinge portion.

18. The refrigerator according to claim 16, further comprising a connection line and a connection line lead-out portion, wherein the connection line is led out through the connection line lead-out portion and the connection line lead-out portion is positioned between the hinge portion and the wireless communication apparatus.

19. The refrigerator according to claim 16, further comprising a connection line and a connection line lead-out portion, wherein:
the connection line includes a connection line connected to the wireless communication apparatus and a connection line led out to the door side; and
the connection line connected to the wireless communication apparatus and a connection line led out to the door side are divided in the connection line lead-out portion for the wireless communication apparatus side and for the hinge portion side.

20. The refrigerator according to claim 16, wherein the wireless communication unit in the wireless communication apparatus is positioned above an upper surface of the housing.

* * * * *